April 18, 1967     L. W. SMITH ETAL     3,314,420
PROSTHETIC PARTS AND METHODS OF MAKING THE SAME
Filed Oct. 23, 1961     6 Sheets-Sheet 1
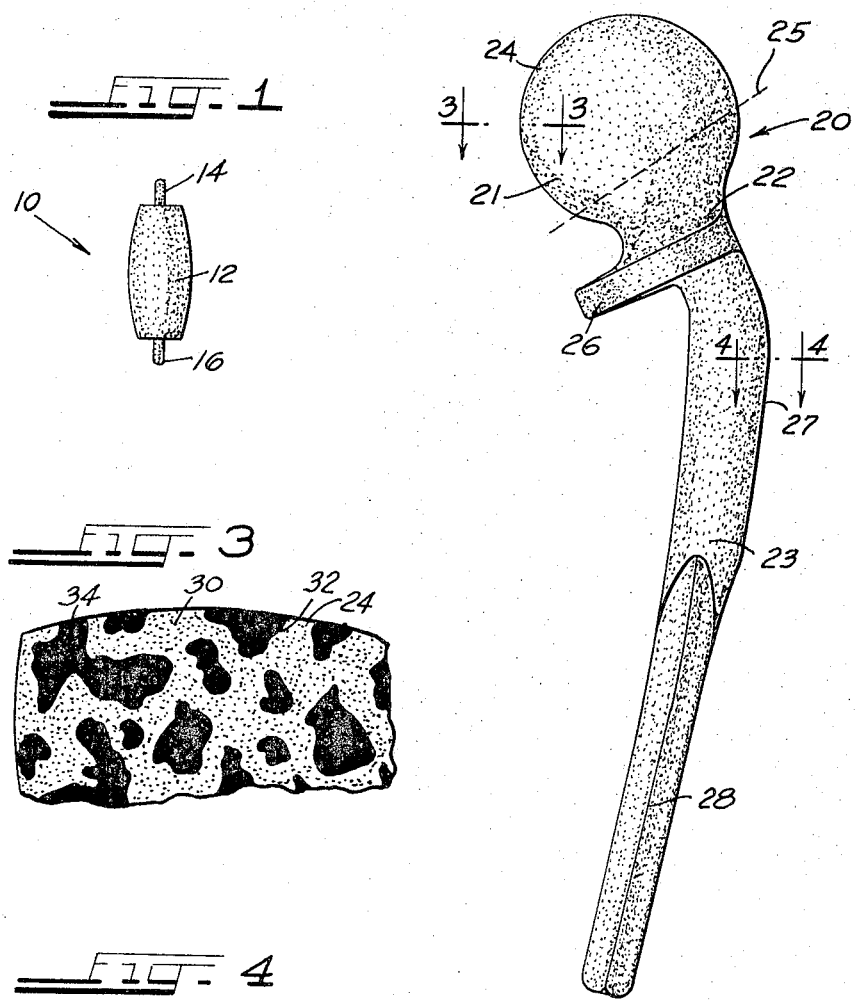
INVENTORS.
LYMAN W. SMITH
JOSEPH F. ESTES
RODERICK J. COWLES
HELMUT BRUCHMANN
BY 
ATT'YS.

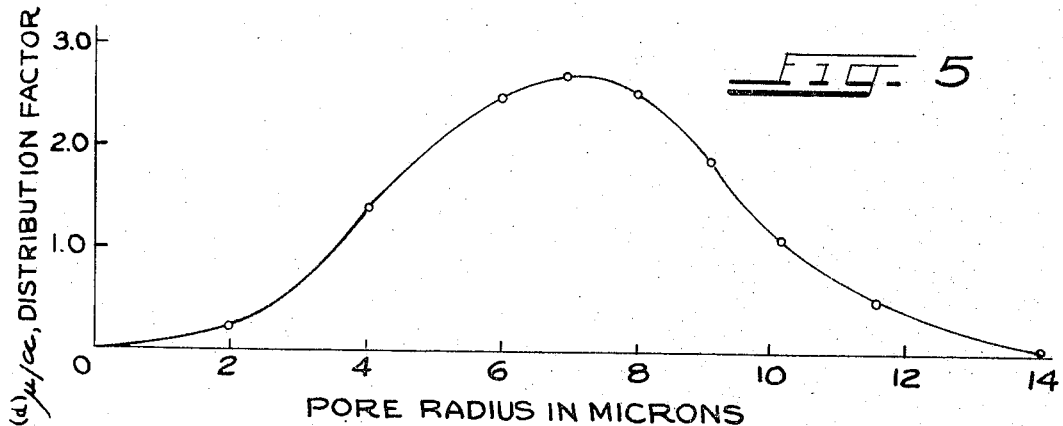
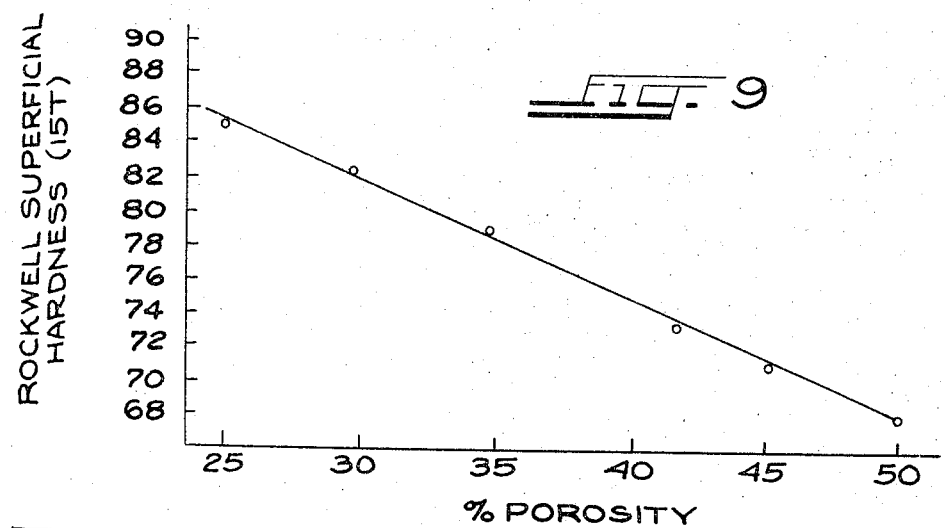
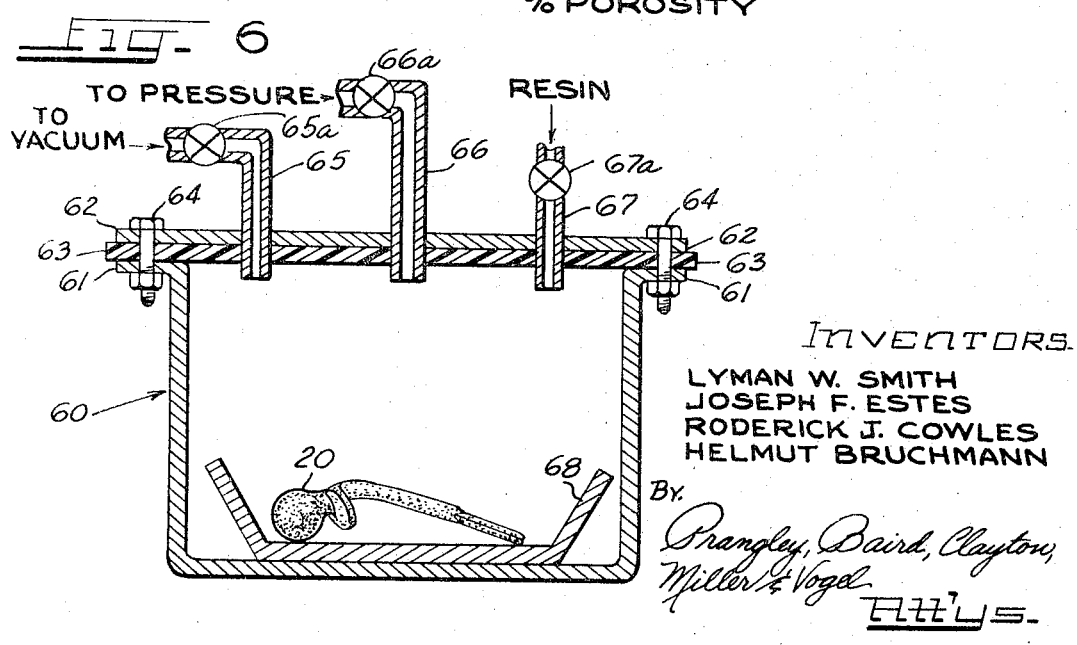

April 18, 1967 L. W. SMITH ETAL 3,314,420
PROSTHETIC PARTS AND METHODS OF MAKING THE SAME
Filed Oct. 23, 1961 6 Sheets-Sheet 4

INVENTORS.
LYMAN W. SMITH
JOSEPH F. ESTES
RODERICK J. COWLES
HELMUT BRUCHMANN

INVENTORS.
LYMAN W. SMITH
JOSEPH F. ESTES
RODERICK J. COWLES
HELMUT BRUCHMANN

BY Prangley, Baird, Clayton, Miller & Vogel
Att'ys.

United States Patent Office 3,314,420
Patented Apr. 18, 1967

3,314,420
PROSTHETIC PARTS AND METHODS OF MAKING THE SAME
Lyman W. Smith, Barrington, and Joseph F. Estes, Dundee, Ill., Roderick J. Cowles, Needham, Mass., and Helmut Bruchmann, Algonquin, Ill., assignors to The Haeger Potteries, Inc., Dundee, Ill., a corporation of Illinois
Filed Oct. 23, 1961, Ser. No. 146,976
26 Claims. (Cl. 128—92)

The present invention relates to improved prosthetic parts and to improved materials useful in forming prosthetic parts and to the method of making the same.

The present invention is particularly useful when applied to prosthetic parts to be used as substitutes for bone in the skeletal structure of an animal or to reinforce the skeletal structure of an animal and will be so described but it is not intended to limit the scope of the invention to such prosthetic parts, as will be described more fully hereinafter, those parts being presented only for purposes of illustration.

Materials of construction utilized heretofore in forming internal prosthetic parts of the type set forth have included metals and plastics, the preferred metal being "Vitallium" and the plastics most generally utilized having been the polyamide or nylon resins and the acrylic resins. The "Vitallium" metal is an alloy comprising 65% cobalt and 30% chromium and 5% molybdenum and is selected for its inertness toward the fluids found in an animal body; however, "Vitallium" has certain serious disadvantages for use as an internal prosthetic part. First of all, the "Vitallium" metal is heavy and has a specific gravity several times that of the bone which it replaces and in addition the metal is relatively brittle and can be shaped only with difficulty. There also have been instances of failure due to stress-corrosion and/or fatigue.

The internal prosthetic parts formed of plastic resins, such as nylon, used heretofore have certain advantages over "Vitallium" in that they are lighter in weight, have a specific gravity more nearly that of the bone which they replace, and when strained more nearly conform to the flexural movements of bone. The structural strength of the plastic resin parts, however, is not as great as the bone which they replace and disastrous results have been encountered in the use of these materials as a result of mechanical failure. There also have been substantial problems preesnted in the use of prosthetic parts formed of plastic resins in that the resins become brittle upon aging and are not sufficiently abrasion resistant; as a result crumbs of the resin sometimes are broken away from the prosthetic part and cause serious damage in the body tissue into which the crumbs come in contact.

All of the internal prosthetic parts available heretofore have had a common deficiency in that no workable structure has been provided which permits incorporation of the internal prosthetic part as an integral portion of the muscular-skeletal system of the associated animal in which the prosthetic part is inserted. Various attempts have been used to provide anchorage means for the growth of bone and muscle on prior prosthetic parts, but such efforts to promote the attachment of bone and muscle have met with failure.

Accordingly, it is an important object of the present invention to provide an improved prosthetic part and particularly an improved prosthetic part for internal use which readily accepts growth of body tissue against the surface thereof.

Another object of the invention is to provide an improved prosthetic part of the type set forth which has at least a portion of the surface thereof porous to facilitate and to enable the growth of bone, muscle and fibrous tissue thereinto so as to incorporate the prosthetic part into the muscular-skeletal system of the body in which the prosthetic part is implanted.

Yet another object of the invention is to provide an improved internal prosthetic part of the type set forth which is highly resistant to chemical attack by animal body fluids and which causes no adverse tissue reaction in the animal.

Still another object of the invention is to provide an improved internal prosthetic part made from an improved structural material which is lightweight and has a density substantially equal to that of bone, yet possesses good structural strength equal to or even exceeding that of bone.

In connection with the foregoing object, it is another object of the invention to provide an improved internal prosthetic part that is formed of a porous ceramic which is highly inert to animal body fluids and which possesses the desired structural characteristics.

Still another object of the invention is to provide an improved prosthetic part of the type set forth which more nearly resembles natural bone in surface color and texture and whcih possesses a dull surface finish which reduces glare at the operative site.

Yet another object of the invention is to provide an improved internal prosthetic part which is formed from an improved composite material comprising a porous ceramic having a synthetic organic plastic resin disposed in the pores thereof and adhering to the walls of the pores to impart to the composite material increased toughness anud flexibility and flexural strength of an order at least equal to and preferably greater than bone.

Still another object of the invention is to provide an improved internal prosthetic part of the type set forth which is readily reproducible so that the characteristics of the parts are predictable, the prosthetic parts being formed of a material of the type set forth which further possesses a hardness such that it can be readily shaped by ordinary tools.

A still further object of the invention is to provide improved methods of making internal prosthetic parts of the type set forth.

Still further features of the invention pertain to the particular arrangement of the elements of the improved prosthetic parts and of the composition of the construction materials thereof, and the steps of the methods of making the prosthetic parts, whereby the above-outlined features and advantages are attained.

The invention, both as to its organization and method, together with further objects and advantages thereof, will best be understood by reference to the following specification taken in conjunction with the accompanying drawings, in which:

FIG. 1 is a plan view on an enlarged scale of an internal prosthetic part in the form of a bone implant made in accordance with and embodying the principles of the present invention;

FIG. 2 is a perspective view on a reduced scale of an internal prosthetic part in the form of a femoral prosthesis made in accordance with and embodying the principles of the present invention;

FIG. 3 is a fragmentary view in cross section on an enlarged scale through the femoral head of the prosthesis of FIG. 2 substantially as seen in the direction of the arrows along the line 3—3 thereof and illustrating the disposition of the synthetic organic plastic resin in the pores of the ceramic material;

FIG. 4 is a fragementary view in section on an enlarged scale along the line 4—4 of FIG. 2 illustrating that the portions of the pores adjacent to the surface are free of resin to permit growth of bone, muscle and fibrous tissue thereinto;

FIG. 5 is a graph showing the size of the pores in the porous ceramic member illustrated in FIGS. 3 and 4 and the distribution thereof in accordance with the pore size;

FIG. 6 is a schematic representation of the apparatus for investing a porous ceramic member with a synthetic organic plastic resin to form a composite material useful in producing an internal prosthetic part in accordance with the present invention;

Figure 7:
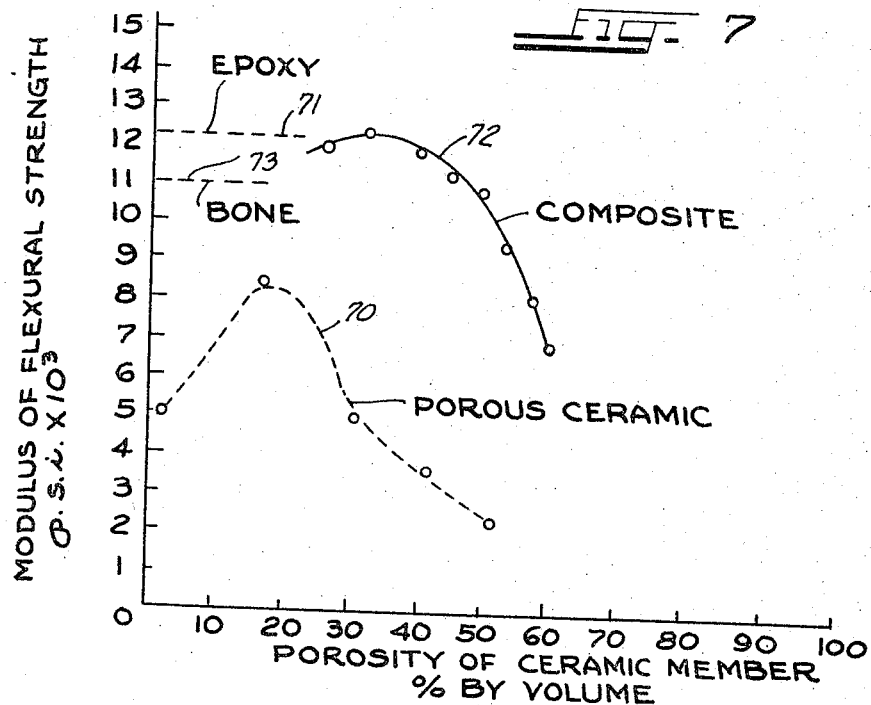
Figure 8:
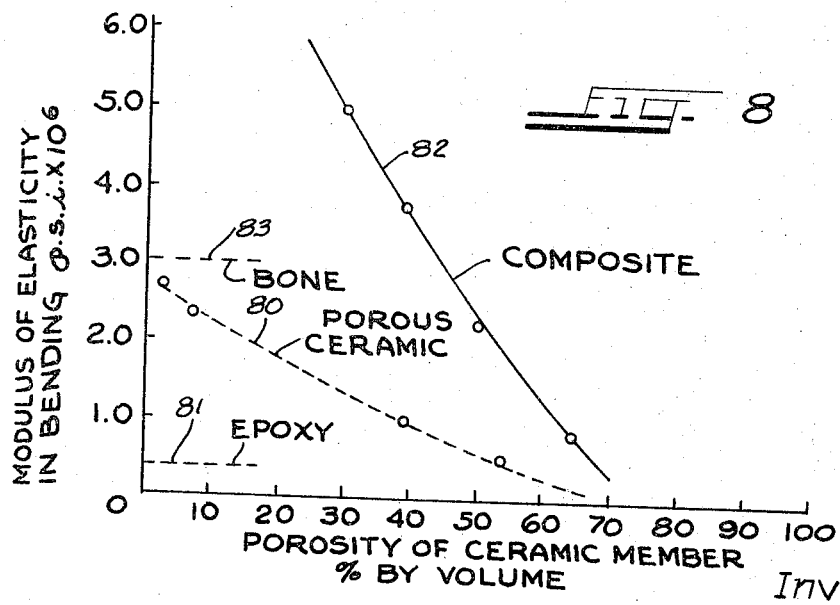
Figure 10A:
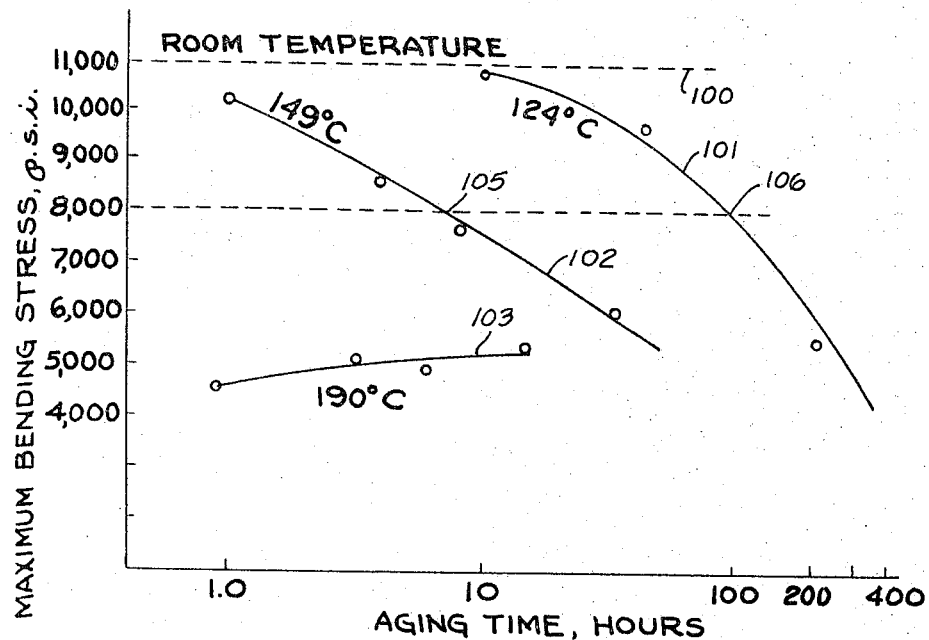
Figure 10B:
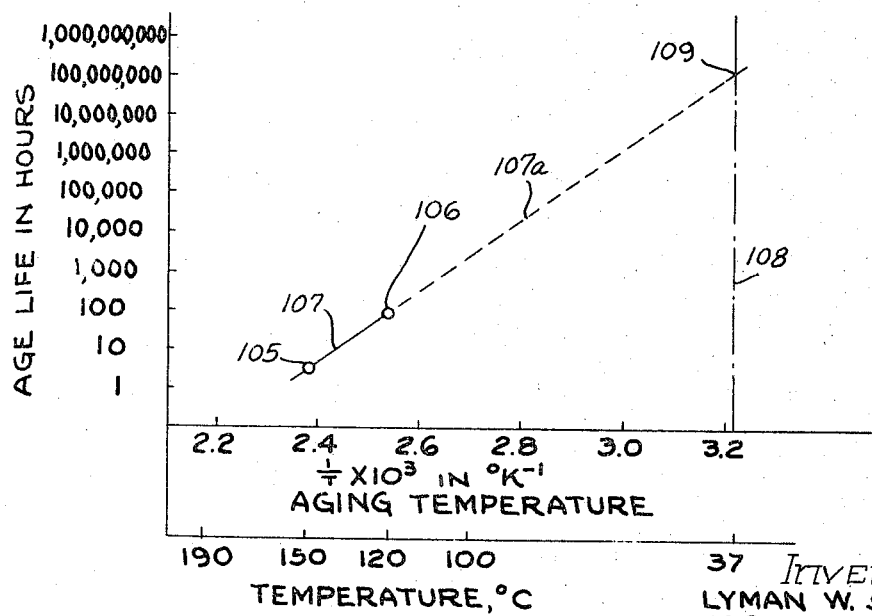
Figure 11:
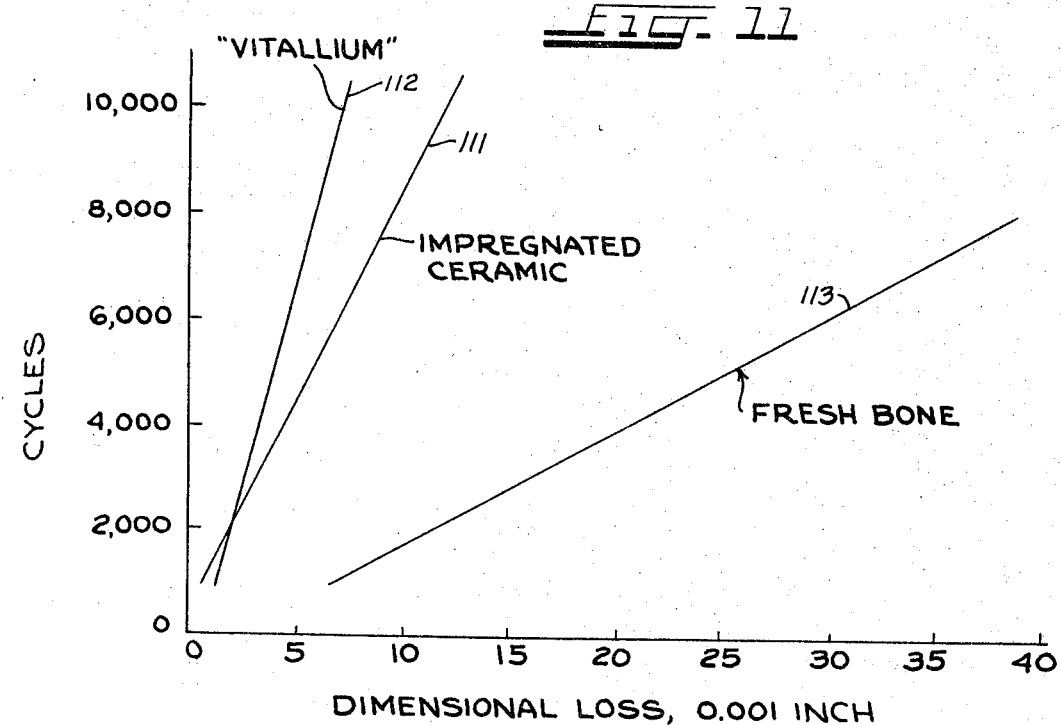
Figure 12:
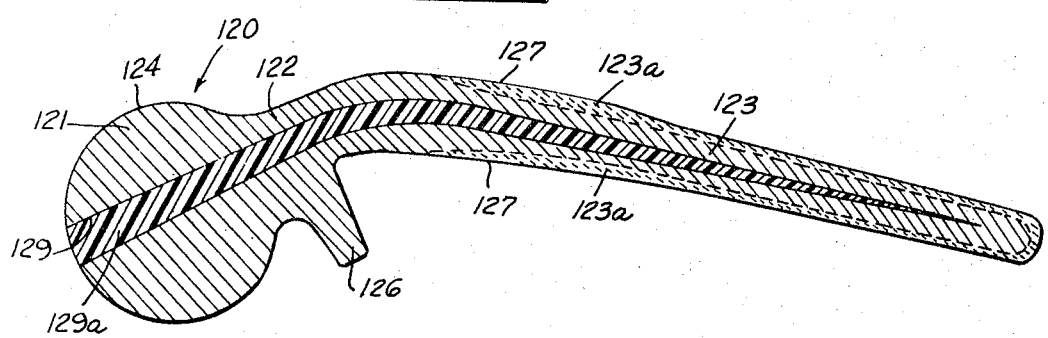
Figure 13:
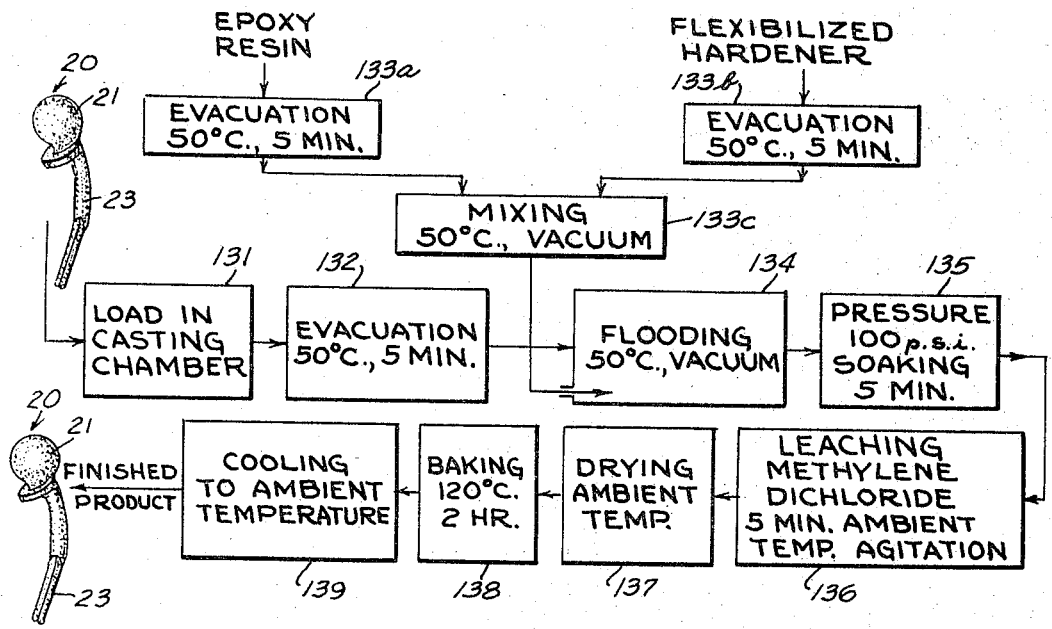
Figure 14:
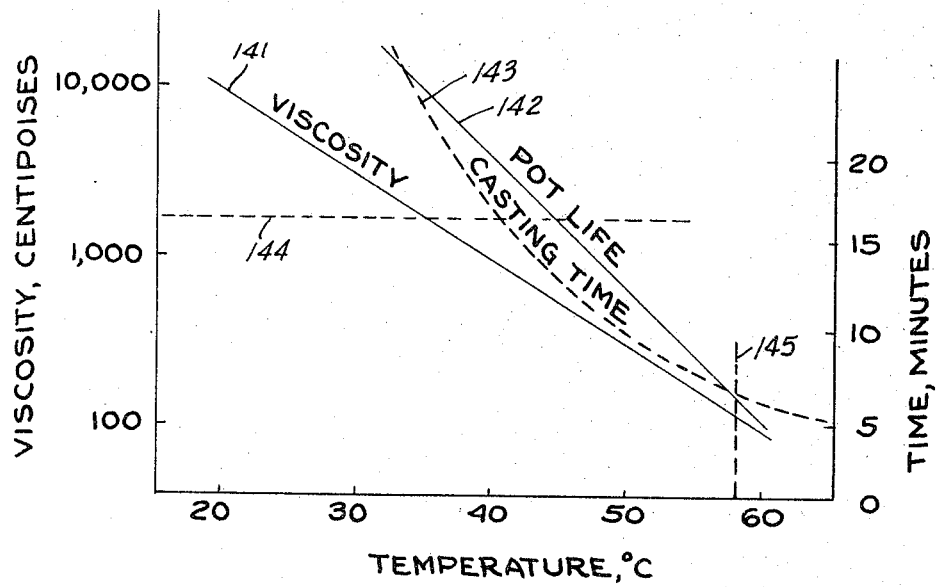

FIG. 7 is a graph showing the relationship between the modulus of flexural strength and the porosity of ceramic members, the curve in dashed lines showing the relationship in a porous ceramic member and the curve in solid lines showing the relationship in a porous ceramic member filled with synthetic organic plastic resin to produce a composite material useful in forming an internal prosthetic part of the present invention;

FIG. 8 is a graph showing the relationship between the modulus of elasticity in bending and the porosity of ceramic members, the curve in dashed lines being that for a porous ceramic member and the curve in solid lines being that for a porous ceramic member filled with a synthetic organic plastic resin to produce a composite material useful in forming an internal prosthetic part of the present invention;

FIG. 9 is a graph showing the relationship between the hardness of the impregnated porous ceramic body and the porosity of the ceramic body;

FIG. 10A is a graph showing the relationship between the maximum bending stress and the time of aging of porous ceramic members filled with a synthetic organic plastic resin, curves at three different temperatures having been illustrated;

FIG. 10B is a graph showing the relationship between the aging temperature and the age life in hours of a porous ceramic member filled with a synthetic organic plastic resin in accordance with the present invention, the data having been derived from FIG. 10A and illustrated to provide an estimate of time for the maximum bending stress to decrease to a value of 8,000 p.s.i. based on the Arrhenius equation;

FIG. 11 is a graph showing the abrasion resistance of the impregnated porous ceramic of the present invention, "Vitallium" and the fresh bone, the dimensional loss in inches being plotted against the cycles of abrasion;

FIG. 12 is a view in cross section through a fermoral prosthesis similar to that shown in FIG. 2 of the drawings and illustrating an improved structure therefor to facilitate the formation of the femoral head as a bearing surface having no pores or holes therein with a shank having the pores in the interior thereof filled with a synthetic organic plastic resin and having the outer portion of the pores open to receive the growth of bone and muscle tissue thereinto;

FIG. 13 is a schematic diagram illustrating the method of impregnating a hip prosthesis such as that illustrated in FIG. 2 with an epoxy resin-flexibilized hardner, the method including the leaching of the resin from the outer portion of the pores to provide open pores to receive the growth of body tissue thereto; and FIG. 14 is a garph showing the relationship between the temperature and the viscosity of the resin solution in FIG. 13, the casting time and the pot life of the resin solution.

In accordance with the present invention, it has been found that superior prosthetic parts can be formed from ceramic materials having desirable structural characteristics. More specifically, it has been found that ceramic prosthetic parts are highly useful, particularly when at least a portion of the surface of the ceramic part is formed porous, further provided that the porous ceramic has the desired mechanical properties to satisfy the demands made thereon at the point of the muscular-skeletal system of the animal body where the prosthetic part is in place. There is shown in FIG. 1 of the drawings a bone segment formed of porous ceramic material made in accordand with the present invention, the bone segment being generally designated by the numeral 10 and including a body 12 having two shafts 14 and 16 extending therefrom for insertion in an associated bone. The bone segment 10 has the entire surface thereof formed porous so as to facilitate and encourage the growth thereinto of the bone, muscle and fibrous tissue so as to incorporate the bone segment 10 as an integral part of the muscular-skeletal system of the body in which it is implanted.

It has been found that a particularly desirable ceramic material for forming the bone segment 10 can be made by mixing by weight from about 44% to about 57% alumina and from 8% to about 25% silica and from about 25% to about 39% of a carbonate of a metal selected from the group consisting of calcium and magnesium, a particular preferred formulation including by weight about 50% alumina and about 16% silica and about 18% calcium carbonate and about 17% magnesium carbonate. The mixture is then ground to a particle size in the range from about 400 mesh to about 270 mesh, a preferred particle size being less than about 325 mesh, the grinding preferably being done wet.

A "green" body is then formed by casting or the like of the ground material after which it may be prefired to a temperature in the range from about 1,600° F. to about 2,000° F., the preferred firing range being from about 1,800° F. to about 1,900° F. thereby to remove all of the water therefrom and to decompose all of the carbonates therein to provide a prefired ceramic body having a plurality of open cells distributed uniformly therethrough, the cells being capillary in size and interconnected to form passages extending from each area in the body to any other area in the body and to and terminating at the surface of the body. In one preferred form of the invention the open cells are interconnected to form a single unitary passage that extends throughout the body and is uniformly distributed therethrough. More particularly, the prefired body has a porosity of the order of about 50% to 70% thereof by weight and has a very low hardness such that it can be readily formed and shaped by ordinary tools to the approximate shape of a desired prosthetic part such as the part illustrated in FIG. 1 of the drawings. At this stage a substantial portion of the shrinkage has taken place due to the removal of the water from the "green" body and the decomposition of the carbonates therein, and further shrinkage will be of a known and controllable amount so that good control of the dimensions of the fully fired body obtained by further heating of the prefired body can be achieved by a careful control of the dimensions of the prefired body.

The prefired body is then finally fired at a temperature in the range from about 2,300° F. to about 2,700° F., a preferred range being from about 2,400° F. to about 2,600° F., to produce a ceramic member having a plurality of open cells distributed uniformly therethrough, the cells being capillary in size and interconnected to form passages extending from each area in the member to any other area in the member and to and terminating at the surface of the member, the passages providing true capillary porosity throughout the ceramic member. In one preferred embodiment of the invention the open cells are all interconnected to form a single unitary passage pervading the entire ceramic member. The porosity of the fired ceramic member can be controlled by controlling the firing temperature, the lower the firing temperature the higher the porosity, and the higher the firing temperature the lower the porosity, whereby a controlled porosity in the range from about 6% to about 65% by volume of the fired ceramic member can be achieved. The dimensions of the fired ceramic body can be carefully controlled and predicted also by control of the firing temperature since the shrinkage occurring between the prefired ceramic body and the fully fired ceramic member is directly proportional to the change in porosity and inversely proportional to the firing temperature, i.e., at a lower firing temperature less shrinkage is experienced, and at a higher firing temperature more shrinkage is experienced.

In order further to illustrate the present invention, the following specific example of a ceramic material useful for making the bone segment 10 is given but it is to be understood that this example is not intended and it is not to be construed as a limitation of the invention but only as an illustration thereof.

EXAMPLE 1

A quantity of calcined kaolin sold under the trademark "Whitetex" was provided having the following composition:

TABLE 1

| "Whitetex" kaolin: | Percent by weight |
|---|---|
| $K_2O$ and $Na_2O$ | 1.25 |
| $TiO_2$ | 0.75 |
| $Fe_2O_3$ | 0.25 |
| $Al_2O_3$ | 54.00 |
| $SiO_2$ | 43.75 |
| | 100.00 |

A quantity of #27 kaolin was provided and used as received, this kaolin having the gross composition indicated in the column to the left and after firing to remove the organic material and the combined water having the composition shown in the column to the right:

TABLE II

| #27 Kaolin | Percent by Weight | |
|---|---|---|
| | Before Ignition | After Ignition |
| $K_2O$ and $Na_2O$ | 0.42 | 0.49 |
| $TiO_2$ | 1.27 | 1.47 |
| $Fe_2O_3$ | 0.29 | 0.34 |
| $Al_2O_3$ | 39.30 | 45.63 |
| $SiO_2$ | 44.86 | 52.07 |
| Loss on Ignition | 86.14 | 100.00 |
| | 13.86 | |
| | 100.00 | |

A quantity of #600 kaolin was provided and used as received, this kaolin having the gross composition indicated in the column to the left and after firing to remove the organic material and the combined water having the composition shown in the column to the right:

TABLE III

| #600 Kaolin | Percent by Weight | |
|---|---|---|
| | Before Ignition | After Ignition |
| $K_2O$ and $Na_2O$ | 0.20 | 0.23 |
| CaO | 0.50 | 0.57 |
| MgO | 0.50 | 0.57 |
| $TiO_2$ | 1.23 | 1.41 |
| $Fe_2O_3$ | 0.11 | 0.13 |
| $Al_2O_3$ | 37.14 | 42.63 |
| $SiO_2$ | 47.46 | 54.46 |
| Loss on Ignition | 87.14 | 100.00 |
| | 12.86 | |
| | 100.00 | |

A quantity of #61 tabular alumina containing 99.5% aluminum oxide was provided and a quantity of dolomite was also provided having the following composition:

TABLE 4

| Dolomite "A-A": | Percent by weight |
|---|---|
| $CaCO_3$ | 54.45 |
| $MgCO_3$ | 40.65 |
| Tremolite ($CaO.3MgO.4SiO_2$) | 4.60 |
| $Al_2O_3$ | 0.20 |
| $Fe_2O_3$ | 0.10 |
| | 100.00 |

A quantity of #2778 talc was then provided and used as received, this talc having the gross composition indicated in the column to the left and after firing to remove the organic material and the combined water having the composition shown in the column to the right:

TABLE V

| #2778 Talc | Percent by Weight | |
|---|---|---|
| | Before Ignition | After Ignition |
| $K_2O$ | 0.22 | 0.25 |
| $Na_2O$ | 0.98 | 1.11 |
| $Fe_2O_3$ | 0.27 | 0.31 |
| $Al_2O_3$ | 1.13 | 1.28 |
| CaO | 10.80 | 12.26 |
| MgO | 23.77 | 26.99 |
| $SiO_2$ | 50.90 | 57.80 |
| Loss on Ignition | 88.07 | 100.00 |
| | 11.93 | |
| | 100.00 | |

The following proportions by weight of the kaolins, the alumina, the dolomite and the talc were then mixed:

TABLE VI

| Ingredient: | Percent by weight |
|---|---|
| "Whitetex" kaolin | 12.00 |
| #27 kaolin | 4.00 |
| #600 kaolin | 16.00 |
| Tabular alumina #61 | 34.00 |
| Dolomite "A-A" | 32.50 |
| Talc #2778 | 1.50 |
| | 100.00 |

The above mixture was then ground in the wet, sodium silicate being added to improve the flowability of the mixture in an amount equal to about 0.2% of the starting solids. Sufficient water was added during grinding to raise the water content of the mixture to 45% by weight, the grinding being continued until only a trace of the solids were retained on a 325 mesh screen, the material retained on the screen being discarded. The ceramic slip thus formed was then cast in a mold having the general shape of the bone segment 10 in FIG. 1 but having increased dimensions to permit and compensate for the shrinkage thereof during the prefiring and the final firing thereof. The "green ware" or green body thus resulting was then dried in the usual manner to ambient humidity conditions and was then ready for prefiring.

The green body was placed in a furnace at ambient temperature and the temperature of the furnace raised to 1,850° F. through a period of about 4½ hours after which no additional energy was supplied to the furnace and the furnace and the prefired body therein were cooled to the ambient temperature for a period of about 4 hours. At this stage of manufacture, the ceramic body has had all of the water removed therefrom and the carbonates have been fully decomposed to form the corresponding oxides, the magnesium carbonate having been substantially decomposed at a temperature of about 1,292° F. and the calcium carbonate having been substantially completely decomposed at a temperature of about 1,517° F., the magnesium carbonate decomposing into magnesium oxide and carbon dioxide gas and the calcium carbonate decomposing into calcium oxide and carbon dioxide gas. Since the individual particles of calcium carbonate and magnesium carbonate are small and are thoroughly dispersed throughout the green body, the carbon dioxide gas produced by the decomposition thereof upon heating is also thoroughly dispersed throughout the green body and forms small individual cells that are uniformly distributed and of substantially uniform size. As the carbon dioxide gas formed is further heated, it passes from cell to cell and eventually to the surface of the green body and as a result of this evolution and escape of the carbon dioxide gas uniformly throughout the body as it is fired, cells of uniform size and uniform dispersion throughout the body are also formed, the cells being open and interconnected to form essentially a single unitary passage throughout the body. Since about one-third of the starting materials on a dry basis are carbonates, the prefired ceramic body has a high porosity of about 60% thereof by volume.

The hardness of the prefired body is very low and after cooling it can be readily machined using ordinary tools to impart thereto a shape such as the prosthetic part 10 of FIG. 1. By careful calculation it is possible to impart dimensions to the prefired body such that the fully fired body will have dimensions well within the desired tolerances for the prosthetic part 10. More specifically, a major portion of the shrinkage of the "green" body is removed during the prefiring thereof since all of the water is removed and the carbonates decomposed during this step. Further shrinkage of the prefired ceramic body in forming the bone segment 10 is directly proportional to the change in porosity, this change being controllable by the choice of temperature in the final firing and being highly predictable whereby a careful shaping and machining of the prefired ceramic body will result in highly predictable final dimensions of the fully fired bone segment 10.

After the final machining and shaping of the prefired ceramic body, it is again placed in the furnace and the temperature within the furnace raised to 2,490° F. during a period of 8 hours after which the furnace is cooled for about 12 hours to the ambient temperature thus cooling the fully fired bone segment 10. The bone segment 10 has a porosity of about 46% by volume, the porosity being provided by a plurality of open cells disposed throughout the bone segment 10 and all interconnected to form a single unitary passage extending throughout the body of the bone segment 10, whereby the unitary passage extends from each area in the bone segment 10 to any other area therein and also extends to and terminates in pores at the surface thereof at a plurality of points. The various portions of the passage and the cells therein are relatively uniform in cross section and impart to the bone segment 10 true capillary porosity throughout the body thereof. The bone segment 10 is inert to most corrosive chemicals including the fluids in an animal body whereby it is admirably suited for its intended use. The bone segment 10 also has outstanding structural properties, for example, a tensile strength of at least 1,300 p.s.i., a modulus of flexural strength of 5,000 p.s.i., a modulus of elasticity of $1.0 \times 10^6$ p.s.i., and a specific gravity of about 1.45.

The starting materials set forth above in Table VI have the following composition prior to ignition and after ignition the composition being expressed in percent by weight:

TABLE VII

| Ingredient | Percent by Weight | |
|---|---|---|
| | Before Ignition | After Ignition |
| $Al_2O_3$ | 48.51 | 50.10 |
| $SiO_2$ | 15.49 | 16.00 |
| $CaCO_3$ | 17.70 | 18.27 |
| $MgCO_3$ | 13.20 | 13.63 |
| $K_2O$ and $Na_2O$ | 0.20 | 0.21 |
| CaO | 0.44 | 0.45 |
| MgO | 0.87 | 0.90 |
| $Fe_2O_3$ | 0.09 | 0.09 |
| $TiO_2$ | 0.34 | 0.35 |
| | 96.84 | 100.00 |
| Loss on Ignition | 3.16 | |
| | 100.00 | |

After the prefiring of the green body, the carbonates have decomposed and all of the combined water and organic matter contained therein have been removed, whereby the composition of the prefired body is as follows, the composition being expressed in terms of the oxides of the ingredients:

TABLE VIII

| Ingredient: | Percent by wt. |
|---|---|
| $Al_2O_3$ | 58.62 |
| $SiO_2$ | 18.72 |
| CaO | 12.52 |
| MgO | 9.38 |
| $K_2O$ and $Na_2O$ | 0.25 |
| $Fe_2O_3$ | 0.10 |
| $TiO_2$ | 0.41 |
| | 100.00 |

The fully fired bone segment 10 has substantially the composition set forth in Table VIII above but it will be understood there is no intent when expressing the composition as set forth in Table VIII to designate the actual compounds present within the bone segment 10.

As has been noted above, the porosity of the fully fired bone segment 10 can be controlled and varied within a substantial range from about 65% by volume down to 6% or even less, the porosity of the bone segment 10 being a function of the final firing temperature thereof. In general the porosity decreases with an increase in the final firing temperature, there being a porosity of about 50% in a bone segment 10 fired at 2,460° F. and a porosity of only 34% in a bone segment 10 fired at a temperature of 2,550° F.

There is illustrated in FIG. 5 of the drawings the range of the size of pores present in the bone segment 10 and the distribution of the various sizes of pores. It will be seen that the pores range in size from approximately ½ micron radius to approximately 14 microns radius with the greater number of the pores having a radius of about 8 microns. By far the greater portion of all the pores have a radius in the range from about 3 microns to about 12 microns whereby the size of the pores in the prosthetic part 10 are within a relatively narrow range of size. It has been found that the pores having this range of size readily accept the growth of the body tissue thereinto whereby to incorporate the bone segment 10 as an integral part of the muscular-skeletal system of an associated animal body.

The data plotted in FIG. 5 were obtained utilizing the "Mercury Intrusion Method" wherein a sample of the porous ceramic was placed in a test chamber of known volume which has previously been evacuated. Mercury was introduced into the test chamber and pressure applied on the test chamber in known increments. The changes in volume within the test chamber were recorded and the incremental changes in volume ($dV$) were plotted corresponding to the incremental changes in pressure ($dP$). From this curve it is possible to compute the values of the distribution factor, $D^{(d)}\mu/cc$.

Recapitulating, the bone segment 10 when made as described above has many important advantages when used as a prosthetic part. The ceramic material of which it is formed is substantially entirely inert to all body fluids in which it comes into contact. The porosity which extends throughout the entire surface of the bone segment 10 facilitates and encourages the growth of bone, muscle and fibrous tissue thereinto, thereby to incorporate the bone segment 10 as an integral part of the muscular-skeletal system of the body in which it is implanted.

There are certain uses of internal prosthetic parts which require properties not possessed by the porous ceramic material from which the bone segment 10 is formed. For example, certain internal prosthetic parts have portions thereof which serve as bearings in joints and the like and it is desirable in such cases to fill the pores of the ceramic material with a filler which will prevent the growth of body tissue thereinto, and it furthermore is useful in certain cases to provide a filler material in the pores which has lubricating properties. In other instances it is desirable that the internal prosthetic part have toughness and flexibility substantially greater than that provided by the porous ceramic material described above. In such cases it is desirable to dispose a filler material in the pores which bonds to the walls defining the pores so as to distribute stresses and shocks throughout a large portion of the prosthetic part thereby to impart to the composite material an apparent or gross flexibility and elasticity substantially greater than that of the porous ceramic material alone. Such a filler material will also tend to heal and to prevent the propagation of flaws, and particularly surface flaws, consisting of, for example, boundary dislocations and retained stresses, which are often found in porous ceramic materials.

There is shown in FIG. 2 of the drawings an internal prosthetic part which must possess physical characteristics different from those of the bone segment 10 described above, the internal prosthetic part of FIG. 2 more specifically requiring a good bearing surface at one portion thereof and increased flexibility and elasticity in bending in yet another portion thereof. More specifically, there is shown in FIG. 2 of the drawings a femoral or hip prothesis of the Eicher type made in accordance with and embodying the principles of the present invention, the prosthetic part being generally designated by the numeral 20. The prosthetic part 20 includes generally a part-spherical or bulbous femoral head 21 having substantially the diameter of the excised femoral head which it is to replace in order to insure facile articulation in the cotyloid cavity of the associated innominate bone. As illustrated, the head 21 is integral with a substantially cylindrical neck 22 having a diameter less than than the major diameter of the head 21 and in turn carries a shank 23 which is to be disposed in an associated femur, the upper portion of which has been excised.

In the femoral prosthesis 20, the head 21 serves as a bearing and particularly the surface 24 thereof above the line designated by the numeral 25 and therefore it is desirable that the pores within the ceramic material be filled to prevent growth of bone tissue thereinto and also to provide an improved bearing surface, while being abrasion resistant. The neck 22 and the shank 23 below the enlargement 26 and including the fluted portion 28 thereof preferably should have a flexibility and elasticity in bending substantially greater than the porous ceramic material and therefore are also preferably filled with a material which in cooperation with the ceramic material provides a composite material having a flexibility and other mechanical characteristics at least equal to that of bone and preferably greater than that of bone.

Preferably the ceramic material in the femoral prosthesis 20 is like that described in detail above with respect to Example 1. The ceramic material can be readily shaped to the form illustrated in FIG. 2, the process preferably comprising the casting of a green body having the general shape of the part 20 and generally larger than the final dimension thereof to accommodate shrinkage of the ceramic material during firing. The green body is prefired to remove the majority of the shrinkage therefrom and the relatively soft prefired ceramic body is then further shaped, if necessary. Thereafter the shaped prefired body is fully fired to produce the final ceramic material having a porosity of about 46% by volume.

The porous ceramic material of the femoral prosthesis 20 can be filled with a single synthetic organic plastic resin which will impart to the head 21 the desirable bearing characteristics required for this portion of the prosthesis and also provide for the neck 22 and the shank 23 the requisite flexural strength. The hardened resin after placement in the pores of the ceramic material must possess certain physical and chemical characteristics to be useful for this purpose. In order to provide a good bearing surface for the head 21, the resin must be hard and abrasion resistant and further must be substantially completely inert to chemical attack by the animal body fluids even during prolonged exposure on the order of many years. In addition the resin must form a good bond with the adjacent walls of the pores in the ceramic material at the surface 24 to insure that no cracks or crevices form therebetween; in general, this means that the resin must have low shrinkage upon hardening and further it must tightly adhere chemically and physically to the ceramic material.

In order for the resin to impart to the neck 22 and the shank 23 the necessary flexural strength, the resin must tightly adhere to the walls of the pores in the ceramic material completely throughout the contacting surfaces and further it must be flexible and resilient so as to absorb impact and to distribute impact applied at any point on the surface to substantially all other parts of the prosthetic part 20 thus to enhance substantially the flexural strength of the composite material.

Furthermore, the resin must be present throughout the entire body of the plastic member (with the exception of certain areas at the surface as will be described more fully hereinafter) and in order to achieve this it is necessary that the resin investing solution must have a viscosity that is less than about 1,500 centipoises at moderate temperatures such that the resin solution does not set up too quickly and become viscous and hard before total investment of the porous ceramic member. In addition the resin solution should have a reaction or hardening time of moderate length, i.e., on the order of 15 to 20 minutes, to insure complete impregnation of the ceramic member, and yet must set up and become hard within a reasonable time, i.e., on the order of 30 to 60 minutes, in order to afford reasonable production rates. Furthermore, the resin solution is preferably one which upon hardening produces no volatile reaction products thus insuring that no blowholes are formed within the hardened resin and further that the resin exhibit substantial dimensional stability upon hardening so as substantially completely to fill the pores within the ceramic material to insure that the hardened resin is tightly and intimatel yadhered to the walls of the ceramic material throughout the contacting surfaces thereof.

Because of the above mentioned requirements placed upon the hardened synthetic organic plastic resin, a preferred class of resins is the thermosetting resins which provide a tightly knit cross-linked molecular structure which is not subject to softening upon continued exposure to the temperature of animal bodies and upon exposure to the fluids in the animal body. More specifically, such hardened resins are corrosion resistant in the sense that they are chemically inert to attack by the fluids in an animal body. It further is desirable that the hardened resin be capable of being machined and tooled in order to provide intricate shapes found in prosthetic parts such as the hip prosthesis 20 in FIG. 2 of the drawings.

It has now been found that a preferred group of synthetic organic plastic resins useful in the present invention to provide the filler in the pores of the ceramic material is that group of resins utilized in the "potting" and encapsulation of electrical circuit elements and the like, including epoxy resins, polyurethane resins, polyester resins, silicone resins, and mixtures of these resins with each other and with other resins such as certain polyamide resins. The following is an example of one preferred form of epoxy resin which is useful in the present invention together with a description of the method of investing a porous ceramic material with the epoxy resin.

EXAMPLE 2

There was provided, 200 parts by weight of an epoxy resin sold under the trademark "ERL 2774," this being a liquid aromatic epoxy resin of the "diepoxide O" type, i.e., a resin having two epoxide linkages and substantially no free hydroxyl groups; and 58 parts by weight of a flexibilizing hardener sold under the trademark "ZZLA 0822," which is a hydroxy-aliphatic amine hardener.

The amounts specified are substantially stoichiometric and, after mixing, these materials have a viscosity of about 400 centipoises at about 50° C. but start to gel in about 15 minutes. The investing was carried out in the apparatus illustrated in FIG. 6 of the drawings including a pressure vessel 60 having an outturned flange 61 and provided with a cover 62 which is clamped by nuts and bolts 64 against a gasket 63 provided on the flange 61 to produce an airtight seal therebetween. The cover 62 is provided with a first connection 65 to an area of reduced pressure and has a valve 65a therein so as to produce a partial vacuum within the sealed vessel 60 when desired. Also mounted on the cover 62 is a connection 66 to a source of air pressure with a valve 66a therein and an inlet 67 for resin with a valve 67a therein. Disposed within the vessel 60 is a dish 68 in which the prosthetic part was placed for investment of resin therein. The various parts were heated and vacuum was applied through the connection 65 by closing the valves 66a and 67a and opening the valve 65a to remove the major portion of the air from the vessel 60 and from within the pores of a prosthetic part within the dish 68. The resin and hardener immediately before and after mixing were also subjected to vacuum to remove entrained air therefrom. The resin was then quickly added to the dish 68 by opening the valve 67a, the level of resin rising therein and entering the pores of the ceramic material of the prothesis from the bottom to force any remaining air upwardly therethrough and the addition of resin was continued until the prosthetic part was covered. The valves 65a and 67a were then closed and the valve 66a opened to admit air under a pressure of 100 p.s.i. to force the resin mixture into the pores of the ceramic material of the hip prothesis 20. The valve 66a was closed and the impregnated prothesis 20 removed from the dish 68. Excess resin was removed therefrom, the resin hardened and cured, and the ceramic-resin surface polished to produce the finished prosthetic part 20.

All of the pores in the ceramic material were completely filled with the epoxy resin as can be best seen in FIG. 3 of the drawings wherein the ceramic material has been designated by the numeral 30. More specifically, the pores 32 in the ceramic material 30 have been completely filled with the epoxy resin which is designated by the numeral 34. The epoxy resin is firmly adherent to the walls defining the pores 32 in the ceramic material 30 and although the two dimensional view of FIG. 3 does not so illustrate, the resin 34 is actually a single continuous phase extending completely through the body of the prosthetic part 20 and is intimately intertwined with a first continuous phase of the ceramic material 30 extending completely throughout the body of the prosthetic part 20. The resultant material is highly resistant to corrosion by animal body fluids. Furthermore, the surface 24 is abrasion resistant and provides a good bearing surface against the associated bone pocket.

The epoxy resin 34 further imparts to the hip prosthesis 20 and particularly to the neck 22 and the shank 23 thereof superior structural characteristics including an improved modulus of flexural strength and modulus of elasticity in bending. Referring to FIG. 7 of the drawings there is shown a graph depicting the relationship between the modulus of flexural strength (modulus of rupture) and the porosity of a ceramic member. The data in FIG. 7 were obtained by preparing bars of material to be tested measuring 4" x ½" x ¼"; a bar to be tested was supported at each end and a load applied from above at the center on a table model "Instron" machine. The cross head was lowered at the rate of 0.2 inch per minute and an automatic recording made of the deflection produced in the test bar. The curve in dashed lines designated by the numeral 70 in FIG. 7 is a plot of the modulus of flexural strength expressed in pounds per square inch against the porosity expressed in per cent by volume of the ceramic body prior to impregnation and from this curve it will be seen that the modulus of flexural strength gradually increases from 5,000 p.s.i. at a low porosity to a peak of about 8,500 p.s.i. at about 20% porosity and thereafter quickly decreases to about 2,500 p.s.i. as the porosity increases to 50%. The horizontal dot-dash line designated by the numeral 71 is a measure of the modulus of flexural strength for the hardened epoxy resin alone utilized in Example 2 above and is about 12,200 p.s.i. The solid line curve 72 is a plot of the modulus of flexural strength of the composite material made in accordance with Example 2 plotted against the porosity of the ceramic member forming a part thereof. It will be noted that the placement of the epoxy resin in the pores of the ceramic member materially increases the modulus of flexural strength thereof and in certain instances more than doubles the modulus of flexural strength, and it further is noted that the composite material through a substantial range of porosity from about 25% to about 40% by volume has a flexural strength in the range from about 12,000 to 12,500 p.s.i. and substantially equal to that of the hardened epoxy resin alone. It will be seen therefore that for those applications wherein it is desirable to have a high modulus of flexural strength in the prosthetic part, the addition of epoxy resin thereto in the pores thereof will materially increase this characteristic. There also is plotted in FIG. 7 a horizontal dashed line designated by the numeral 73 and representing a typical value of 11,000 p.s.i. for the modulus of flexural strength for human bone; it will be seen that the composite material has a substantially greater modulus of flexural strength than that of natural bone when the porosity of the ceramic member is in the range from about 25% to about 50% by volume.

There are plotted in FIG. 8 the modulus of elasticity in bending for the porous ceramic body and the porous ceramic body impregnated with epoxy resin versus the porosity of the ceramic member as well as values for bone and the epoxy resin alone. The values for the modulus of elasticity in bending were derived from the same test utilized in producing the data for the graph of FIG. 7 utilizing the formula $$E_b = \frac{L^3 m}{4bd^3}$$

wherein $E_b$ is the modulus of elasticity in bending, L is the span between the points of support on the test bar, $m$ is the slope of the stress-strain curve for the test bar, $b$ is the width of the test bar and $d$ is the depth or thickness of the test bar in the direction of application of the load. The curve in dashed lines designated by the numeral 80 in FIG. 8 is a plot of the modulus of elasticity in bending expressed in pounds per square inch versus the porosity in percent by volume of the porous ceramic body prior to impregnation and from this curve it will be seen that the modulus of elasticity gradually decreases with an increase in porosity with a value of $2.75 \times 10^6$ at about 3% porosity to a value of about $0.5 \times 10^6$ at 55% porosity. The horizontal dashed line designated by the numeral 81 is the value of the modulus of elasticity for the hardened epoxy resin alone utilized in Example 2 above and is about $0.35 \times 10^6$ p.s.i. The solid line curve 82 is a plot of the modulus of elasticity of the composite material made in accordance with Example 2 plotted against the porosity of the ceramic member forming a part thereof. It will be noted that the placement of the epoxy resin in the pores of the ceramic member materially increases the modulus of elasticity in bending thereof and in most instances more than triples the modulus of elasticity. The modulus of elasticity for a composite member in which the ceramic member has a porosity of 30% is about $5 \times 10^6$ p.s.i. whereas the porous ceramic member forming a part of the composite member has a modulus of elasticity of about $1.5 \times 10^6$ p.s.i. There also is plotted in FIG. 8 a horizontal dashed line designated by the numeral 83 representing a typical value of $3 \times 10^6$ p.s.i. for the modulus of elasticity of human bone, this value also typically ranging down through a range to a value of $2.0 \times 10^6$ p.s.i. It will be seen that the composite member made in accordance with Example 2 above has a modulus of elasticity which substantially matches that of human bone (the value of $3.0 \times 10^6$ p.s.i. at 46% porosity) and, furthermore, the composite members having other porosities both above and below 46% have moduli of elasticity in the same range as that for human bone.

A composite member including a porous ceramic member impregnated with a flexibilized epoxy resin in accordance with Example 2 above has a substantial hardness and furthermore, the hardness varies inversely in accordance with the porosity of the ceramic member forming a part thereof. Referring to FIG. 9 of the drawings, there is a plot of the Rockwell superficial hardness (15T) versus the porosity of the ceramic member, this data having been obtained by testing samples on a Wilson-Rockwell instrument using a 3 kilogram minor load, a 15 kilogram major load and a 1/16 inch ball penetrator. Values obtained range from 85 for a piece having a 25% porosity to about 68 for a piece having a 50% porosity, the hardness being substantially a straight line function of the porosity of the ceramic member forming a part of the composite member.

Substantial tests have also demonstrated that the material produced in accordance with Example 2 above when incorporated in the hip prosthesis of FIG. 2 will have a life expectancy when exposed to normal body environmental aging far in excess of that of the patient on which the hip prosthesis may be used and generally on the order of about 23,000 years, the results of these tests being shown in FIGS. 10A and 10B of the drawings. The data in FIGS. 10A and 10B were obtained utilizing accelerated thermal aging tests wherein test samples made in accordance with Example 2 above were completely immersed in a normal saline (0.85% sodium chloride) solution having an overhead air atmosphere as an environment. Test bars measuring 4½" x ½" x ¼" were placed in the saline solution in glass tubes and the tubes sealed with a volume of air therein equal to the volume of the saline solution and the bars were aged at elevated temperatures in the saline solution for varying periods of time. Three series of tests were run at 124° C., 149° C. and 190° C. After the samples had been immersed for a predetermined period of time at the elevated temperature, the tubes were opened and the maximum bending stress expressed in p.s.i. was determined utilizing the method described above when discussing FIG. 7 of the drawings. The test bars had a maximum bending stress at room temperature of about 11,500 p.s.i., this value being indicated by the dashed line 100 in FIG. 10A. The heating of the test bars in the saline solution at 124° C. gradually reduced the maximum bending stress to a value of about 5,500 p.s.i. after 200 hours and heating of the test bars in the saline solution at 149° C. even more quickly decreased the maximum bending stress thereof, the data obtained at 124° C. being plotted along the curve 101 and the data obtained at 149° C. being plotted along the curve 102. At 190° C. the test bars rapidly deteriorated in the saline solution so that the maximum bending stress after only one hour was about 4,500 p.s.i. but thereafter continued heating actually slightly improved the maximum bending stress so that after only 11 hours the value thereof was about 5,200 p.s.i., the data being plotted along the curve 103.

The time required to reduce the maximum bending stress of the test bars to a value of 8,000 p.s.i. at the temperature of the human body, about 37° C., was estimated utilizing the Arrhenius equation of the general form:

$$\log_e t = \frac{K}{T} + C$$

wherein $t$ is the age life in hours, $T$ is the aging temperature in °K., and $K$ and $C$ are constants. The age life to reduce the maximum bending stress to 8,000 p.s.i. at 124° C. and 149° C. is determined by drawing the horizontal dashed line 104 in FIG. 10A and noting the points at which it crosses the curves 101 and 102 therein, the plot of these two points 106 and 105 respectively, being seen in FIG. 10B and joined by a solid line 107. To estimate the age lift at body temperature, the curve 107 is extrapolated upwardly along the dashed curve 107a until it intersects the 37° temperature line 108 at the point 109, this point 109 of intersection being taken as the estimated age life in hours for the material, i.e., the time required to reduce the maximum bending stress thereof to 8,000 p.s.i. at 37° C. The age life is about $2 \times 10^8$ hours or 23,000 years, a substantial length of time compared to the life expectancy of the patient on which the hip prosthesis would be used.

The good abrasion resistance of the composite material made in accordance with Example 2 above is one of the most important characteristics thereof when utilized as an internal prosthetic part such as the hip prosthesis 20 of FIG. 2. It has been found that the impregnated ceramic has an abrasion resistance substantially greater than fresh human bone and substantially as good as the "Vitallium" metal utilized heretofore for making hip prosthesis. The abrasion resistance was tested on a Custom Scientific Stoll Universal Wear Tester which had been modified to provide a moving abrasion surface against which the test specimen was pressed and urged under a predetermined load. More specifically, the sample to be tested was mounted on an instrument table that reciprocated through a 1 inch stroke at the rate of 125 cycles per minute and a 500A waterproof "Carborundum" silicon carbide paper was moved at the rate of 5 inches per minute under an abradant head having a ¼ inch diameter and applied to the paper to urge the abrasive thereon against the sample surface at a pressure of 100 pounds per square inch. The change in thickness in the sample due to abrasion was recorded periodically and a plot of the loss in dimension versus the cycles of movement of the abraded head is shown in FIG. 11 of the drawings. The test results as applied to the impregnated ceramic material made in accordance with Example 2 above are plotted as the curve 111 and it will be seen that after 1,000 cycles, the dimensional loss was slightly less than 0.001 inch and after 10,000 cycles the loss was about 0.012 inch. Test samples formed of "Vitallium" metal after 1,000 cycles had lost 0.002 inch whereby the impregnated ceramic showed better wear resistance through 2,000 cycles than did the "Vitallium" metal. The "Vitallium" metal thereafter wore at a lesser rate than the impregnated ceramic and at 10,000 cycles exhibited a loss of about 0.006 inch, the curve plotting the data for "Vtiallium" metal being designated by the numeral 112. There also is plotted in FIG. 11 a curve 113 showing the dimensional loss of fresh bone, the loss amounting to 0.006 inch after 1,000 cycles and about 0.038 inch after 8,000 cycles, thus indicating that the impregnated ceramic made in accordance with Example 2 is substantially more abrasion resistant than fresh human bone under the test conditions applied. It further was noted during the abrasion resistance tests that no small pieces or spicules of either ceramic or plastic resin were formed on the surface of the impregnated ceramic during the entire test procedure.

In those cases wherein the surface of the prosthetic part is bathed in synovial fluid, such as when the surface 24 of the hip prosthesis 20 of FIG. 2 is disposed in the adjacent cavity in the human body, there is no tendency for flesh to cling and adhere thereto, probably because of the presence of the indicated synovial fluid. It has been found, however, that when the surface 24 is implanted at a point of the body wherein it is desirable for muscle and other tissue to attach thereto, the tissue quickly grows against and clings to the surface 24 including both the ceramic portion and the resin portion thereof. In certain instances it is desirable to provide a more firm attachment between the body tissue and the prosthetic part, such as, for example, in the case of the shank 23 in the end of the associated femur, in which case it is desired that the shank 23 be firmly and immovably attached with respect to the femur. A substantial and useful attachment of the body tissue can be made to the shank 23 even though it has a surface such as that illustrated in FIG. 3 of the drawings but an even more firm attachment can be provided if a portion of the pores adjacent to the surface, such as the surface 27 on the shank 23, do not have the resin 24 therein so that the body tissues can grow into the pores 32, this condition being diagrammatically illustrated in FIG. 4 of the drawings. As illustrated in FIG. 4, the pores 32 are free of the epoxy resin 34 for a depth of approximately 50 mils. In one preferred method of providing the open pores at the surface 27 of the hip prosthesis 20, the prosthesis 20 immediately after placement of the epoxy resin in the pores of the ceramic body thereof is placed in a bath of methylene dichloride at ambient temperature and is agitated therein for a period of two to thirty minutes, the depth of the open pores formed being proportional to the time of leaching by the methylene dichloride, approximately two to five minutes of leaching providing open pores of a depth of about 50 mils as illustrated in FIG. 4. After leaching, the resin is cured in the usual manner by heating for three hours at 120° C. fully to cure the thermosetting epoxy resin. The open pores 32 thus provided readily accept the growth of tissue thereinto which more firmly anchors the prosthetic part such as the shank 23 of the hip prosthesis 20 in the muscular-skeletal system of the associated body.

Referring to FIG. 13 of the drawings, there is shown therein a schematic representation of the method of impregnating the hip prosthesis 20 to provide a smooth bearing surface on the head 21 and a plurality of open pores on the surface of the shank 23 with resin distributed throughout the remaining portion of the pores and passages therein to increase the flexural strength thereof. The porous ceramic member shaped like the hip prosthesis 20 is first loaded into the casting chamber as at 131 and the casting chamber is then evacuated as at 132 and heated to a temperature of 50° C., the evacuation being carried out by a water ejector operating at a water temperature of 60° F. for a period of five minutes. Simultaneously the epoxy resin is being evacuated at 50° C. for five minutes by means of a water ejector in the evacuation chamber 133a and the flexibilizer hardener is being similarly evacuated in the chamber 133b in order to remove any entrained air therefrom. The resin and the hardener are then mixed in an evacuated mixing chamber 133c after which the mixture is flooded at 50° C. into the evacuated chamber at 134. After the resin-hardener mixture has flooded the ceramic piece, positive pressure of 100 p.s.i. is applied and the part is cooled for five minutes at 135. The impregnated hip prosthesis 20 is then removed from the pressure chamber and the shank 23 is placed in a leaching bath of methylene dichloride at 136 and leaching is carried out at ambient temperature for five minutes with agitation. The hip prosthesis 20 with its leached shank 23 is then dried at 137 at ambient temperature after which the epoxy resin is finally cured in the baking oven 138 at 120° C. for two hours. The piece is then cooled at 139 at ambient temperature to provide the finished product, the hip prosthesis 20.

It will be understood that a wide variety of prosthetic parts may be made from the ceramic body of the present invention, and particularly the ceramic body having pores in the surface thereof, and the ceramic body having passages throughout the body thereof as illustrated by the bone segment 10, and also the composite material comprising the porous ceramic body having the passages therein filled with a synthetic organic plastic resin as is exemplified by the hip prosthesis 20 of FIG. 2. For example, other prosthetic parts may be made from one or more of these materials including various fasteners such as screws, nails, roll pins, washers, stop nuts, bolts, corrugated fasteners such as those of the Brown type, and the like; plates including bone plates, knee plates, contact splints, cooptation plates, spinal fusion plates, knee buttons, finger caps, patella caps; splines including hip splines, finger splines, humeral splines, and intramedullary splines; nail-holding plates; scalp plates; hip and shoulder appliances and prosthesis and cups including in addition to the Eicher type hip prosthesis illustrated in FIG. 2, cannulated hip prosthesis, shoulder prosthesis, hip fusion appliances, acetabulum cups, hip cups, elbow prosthesis, complete mechanical elbows, carpal scaphoid replacements and radius caps; trochanteric nail plates and intertrochanteric appliances; non-orthopedic appliances including orbital implants, nasolacrimal duct tubes, ear molds, hernia plates, bile duct tubes, colostomy plugs, testicular implants, blood vessel tubes, portacaval shunt tubes, vein bridging tubes and vein-cuffing tubes; mandibular reconstructive appliances including mandibular bone plates; replacement for teeth to be implanted in the cavity produced by extraction of a normal tooth, and anchor members to be planted in the mandibular processes for the anchoring of artificial teeth thereon; various reconstructive appliances in addition to those named above including those for replacing the proximal third of the femur, the proximal two-thirds of the femur, the distal third of the femur, the distal end of the humerus, head replacement for the humerus, proximal half of the radius, mid portion of the ulna the astragalus, the right and center sections of the pelvis, the left and center sections of the pelvis, the manubrium portion of the sternum. In this specification and in the following claims, it is to be understood that the term "prosthetic part" is intended to include all of the various parts and appliances set forth above and like parts and appliances without limitation to those specifically illustrated in the drawings and specifically named in the foregoing list.

Other porous ceramic bodies may be utilized in the present invention in addition to those discussed above in connection with Examples 1 and 2 and it further has been found that the placement of the epoxy resin-flexibilized hardener material in the pores of these other ceramic bodies has materially increased the modulus of flexural strength and the modulus of elasticity in bending thereof.

EXAMPLE 3

A porous ceramic body sold under the designation "Selas Grade 01" was chosen having pores throughout the body thereof having radii in the range from about 1.0 micron to about 4.5 microns with the major portion of the pores having a radius of about 4.0 microns, the pores constituting about 65% by volume of the ceramic body. Such a material has a modulus flexural strength of 932 p.s.i. and a modulus of elasticity in bending of $1.00 \times 10^6$ p.s.i. The ceramic body was impregnated with the formulation and in accordance with the method of Example 2 above and the composite impregnated ceramic body was found to have a modulus of flexural strength of 5,580 p.s.i. and a modulus of elasticity in bending of $1.62 \times 10^6$. The material was found to be very useful for the fabrication of prosthetic parts.

EXAMPLE 4

A porous ceramic body having a porosity of 71% by volume and sold under the designation "Selas Grade 10" was provided. This material had pores having radii in the range from about 0.5 micron to about 6.0 microns with the greater portion of the pores having a radius of about 4.0 microns; the modulus of flexural strength was 1,420 p.s.i. and the modulus of elasticity in bending was $0.97 \times 10^6$. This ceramic body was impregnated utilizing the formulation and the method of Example 2 above completely to fill the pores thereof with the flexibilized epoxy resin. The composite body thus produced had a modulus of flexural strength of 7,670 p.s.i. and a modulus of elasticity in bending of $1.72 \times 10^6$ p.s.i. Prosthetic parts formed of the composite material were satisfactory.

EXAMPLE 5

A porous ceramic body having a porosity of 66% by volume was provided, the ceramic body being sold under the designation "Selas Grade 015." The pores in the body had a radius in the range from about 0.5 to about 2.0 microns with the majority of the pores having a radius of about 1.0 micron. This material had a modulus of flexural strength of 2,140 p.s.i. and a modulus of elasticity in bending of $1.0 \times 10^6$ p.s.i. The ceramic body was impregnated utilizing the formulation and the method set forth above in Example 2 and the resultant composite body had a modulus of flexural strength of 8,820 p.s.i. and a modulus of elasticity in bending of $1.60 \times 10^6$ p.s.i. Prosthetic parts made from the composite body exhibited the desirable characteristics described above.

EXAMPLE 6

A porous ceramic body having a porosity of 22% by volume and designated "Coors #750" was provided having a modulus of flexural strength of 2,920 p.s.i. and a modulus of elasticity in bending of $1.04 \times 10^6$ p.s.i. The porous ceramic body was impregnated utilizing the formulation and the method set forth in Example 2 above and the resultant composite body had a modulus of flexural strength of 3,380 p.s.i. and a modulus of elasticity in bending of $1.26 \times 10^6$ p.s.i. The composite material was found to be useful for the fabrication of prosthetic parts.

A composite material having an unusually large modulus of flexural strength was prepared utilizing a modification of the ceramic body set forth in Example 1 above. The ingredients in the proportions set forth in Table VI were mixed and ground as set forth in Example 1 after which the wet mixture was dried and then broken up. Only those pieces passing an 18 mesh screen and retained on a 40 mesh screen were taken, mixed with ½% by weight of a wax compound sold under the trademark "Ceremul," and then pressed and compacted in a steel die under 60,000 lbs. pressure. The resultant dry-pressed "green body" was fired in accordance with the method of Example 1 to provide a porous ceramic body having a porosity of 46.7% by volume with the radii of the pores lying in the range from 0 micron up to 8.5 microns with none above 8.5 microns and with the greatest portion of the pores having a pore radius of 8.5 microns. This porous ceramic body was impregnated in accordance with the method of Example 2 and the resultant composite material had a modulus of flexural strength of 18,000 p.s.i.

From the above examples, it will be seen that a large variety of porous ceramic bodies are useful in the present invention. In general it has been found that those porous ceramic bodies are useful which contain pores having a radii in the range from 0.5 to about 50 microns and in which the pores constitute from about 6% to about 75% by volume of the ceramic body. A preferred range of the radii for the pores in the ceramic body is from about 3 to about 12 microns and a preferred porosity for the ceramic body is from about 30% to about 60% thereof by volume. The specific gravities of the useful porous ceramic bodies also preferably lie in the range from about 1.0 to about 2.7, the preferred range being from about 1.3 to about 2.2.

Other epoxy resins may be utilized to fill the pores in the porous ceramic body when it is desired to form a composite material for use in fabricating prosthetic parts in accordance with the principles of the present invention. In general any of the epoxy formulations which are liquid at room temperature and which when mixed with a hardener having a low viscosity on the order of less than about 1500 centipoises at the impregnating temperature may be used. The following is an example of a standard liquid aromatic epoxy resin formulation utilizing an aromatic amine hardener.

EXAMPLE 7

There were mixed by weight 100 parts of a liquid aromatic epoxy resin sold under the trademark "DER 332" and 27.5 parts of an aromatic amine hardener, 4-4'-methylenedianiline (MDA), at a temperature of 70° C. The mixture was used to impregnate a porous ceramic part having a porosity of 46% by volume at a temperature of 70° C., after which the resin was cured at 165° for 3 hours. The resultant composite material had chemical, physical and structural properties rendering it particularly useful in the fabrication of prosthetic parts, i.e., a modulus of flexural strength of 8,500 p.s.i. and a modulus of elasticity in bending of $2.3 \times 10^6$ p.s.i.

An increased and substantially indefinite pot life at room temperature is provided by the following example:

EXAMPLE 8

There were mixed by weight 100 parts of an epoxy resin sold under the trademark "Araldite 6005" and 80 parts of a low viscosity and high temperature hardener designated "Methyl Nadic Anhydride" or "MNA" at a temperature of 100° C. The mixture was used to impregnate a porous ceramic part having a porosity of 48.6% by volume at a temperature of 100° C., after which the resin was cured at 150° C. for 2 hours, and then at 180° C. for 16 hours and then at 200° C. for 2 hours. The resultant composite material had chemical, physical and structural properties rendering it particularly useful in the fabrication of prosthetic parts, i.e., a modulus of flexural strength of 7,000 p.s.i. and a modulus of elasticity in bending of $2.4 \times 10^6$ p.s.i.

An example of an epoxy resin system having a substantially indefinite pot life at room temperature and utilizing a high impregnating temperature and a hardening catalyst is as follows:

EXAMPLE 9

There were mixed by weight 100 parts of an epoxy resin sold under the trademark "ERL 2774," 80 parts of the hardener MNA, and 1.5 parts of the catalyst tri(dimethylaminomethyl) phenol ("DMP–30") at a temperature of 55° C. The mixture was used to impregnate a porous ceramic part having a porosity of 46% by volume at a temperature of 55° C., after which the resin was cured at 93° C. for 2 hours and then at 170° F. for 24 hours. The resultant composite material had chemical, physical and structural properties rendering it particularly useful in the fabrication of prosthetic parts, i.e., a modulus of flexural strength of 9,300 p.s.i. and a modulus of elasticity in bending of $2.6 \times 10^6$ p.s.i.

The following is an example of a phenolic modified epoxy resin system and having a substantially indefinite pot life at room temperature.

EXAMPLE 10

There were mixed by weight 100 parts of a phenolic modified epoxy resin sold under the trademark "DEN 438," 101 parts of the hardener MNA, and 1.5 parts of the catalyst DMP-30 at a temperature of 70° C. The mixture was used to impregnate a porous ceramic part having a porosity of 45% by volume at a temperature of 60° C., after which the resin was cured at 93° C. for 2 hours and then at 170° C. for 20 hours. The resultant composite material had chemical, physical and structural properties rendering it particularly useful in the fabrication of prosthetic parts, i.e., a modulus of flexural strength of 9,700 p.s.i. and a modulus of elasticity in bending of $2.8 \times 10^6$ p.s.i.

The hardener utilized in Example 2 above is a so-called "flexibilizing" hardener which combines the function of an ordinary hardener and a flexibilizing modifier. The following is an example of the use of a standard hardener together with a flexibilizing modifier to give added flexibility to a standard liquid epoxy system.

EXAMPLE 11

There were mixed 150 parts by weight of a liquid aromatic epoxy resin sold under the trademark "Araldite 6005," 27.5 parts by weight of a standard hardener sold by Ciba Products Corporation and identified as "951" and 150 parts by weight of a flexibilizing modifier sold under the trademark "DP–437." The ingredients were mixed and the resultant mixture utilized to impregnate a porous ceramic prosthetic part in accordance with the method of Example 2 above. The resultant composite material had good chemical, physical and structural characteristics comparable to those of the composite material produced by Example 2 above.

A combination of a flexibilizing hardener and a flexibilizing modifier can also be utilized, the following being a specific example of such a formulation:

EXAMPLE 12

There were mixed by weight 150 parts of an epoxy resin sold under the trademark "Araldite 6005," 150 parts of the flexibilizing modifier sold under the trademark "DP–437" and 50 parts by weight of the flexibilizing hardener sold under the trademark "ZZLA 0822." A porous ceramic piece was impregnated utilizing the resultant resin mixture in accordance with the method of Example 2 above and the composite material thus formed had chemical, physical and structural characteristics comparable to those of the product from Example 2.

Various reinforcements and fillers may also be utilized in the resin compositions used to impregnate the porous ceramic material. A typical reinforcement that is useful in certain cases is a fiber reinforcement such as glass fiber reinforcements. The following is an example of a resin composition utilizing glass fiber reinforcements therein.

EXAMPLE 13

To the resin mixture of Example 2 above is added 40 parts by weight of glass fibers milled to a diameter of 2.5 to 3.0 microns and sold under the trademark "HDX–25." The resin mixture was impregnated in a porous ceramic piece using the method of Example 2 above. The resultant composite material exhibited substantially the same desirable chemical, physical and structural characteristics of the product of Example 2 above.

Various inert inorganic fillers may be used which are of granular rather than fiber shape and the following is an example of such a formulation.

EXAMPLE 14

There were mixed together three hundred parts by weight of an epoxy resin containing no solvents or reactive diluents and sold under the trademark "ERLR 2772," 87 parts by weight of the flexibilizing hardener sold under the trademark "ZZLA 0822," and 80 parts by weight of Georgia kaolin sold under the trademark "REA 65." A porous ceramic piece was impregnated with the resin mixture in accordance with the method of Example 2 above and there was produced a composite material having the improved chemical, physical and structural characteristics comparable to those of the product made by Example 2 above. The composite material containing a kaolin filler is even more inert to animal body fluids since the filler particles exposed on the surface of the resin are completely inert and substantially more inert than the resin about the filler particles.

In place of the kaolin used in Example 14 above as an inert filler, aluminum oxide can be used, the aluminum oxide being ground to a particle size finer than 10 microns. A silver powder sold under the trademark "V–9" can also be utilized as an inert filler.

In the place of the epoxy resin system illustrated in Example 2, a polyurethane resin system may be utilized to fill the pores of a porous ceramic body to provide a composite material having characteristics useful in prosthetic parts superior to those exhibited by the porous ceramic alone. The following is a specific example of an impregnating formulation utilizing polyurethane resin.

EXAMPLE 15

There were mixed by weight 300 parts of a polyurethane liquid resin sold under the trademark "Adiprene L–100," and a curing agent including 1.5 parts of trimethylalpropane, 5.3 parts of 1,4 butanediol and 16.5 parts of 4,4'-methylene-bis - 2-chloroaniline (MOCA) (melted at 120° C.). A porous ceramic body was impregnated utilizing the resultant resin mixture in accordance with the method of Example 2 above and the composite material thus formed had chemical, physical and structural characteristics rendering it particularly useful in the fabrication of prosthetic parts.

It also has been found that mixtures of the various resin systems are also useful in preparing composite materials that are particularly adapted to fabrication into prosthetic parts. The following is an example of formulation in which both epoxy and polyurethane resins are utilized.

EXAMPLE 16

There were mixed by weight 170 parts of a liquid urethane resin sold under the trademark "Adiprene L–100," 130 parts of an epoxy resin sold under the trademark "ERL 2774," and 84 parts of the curing agent 4,4'-methylene-bis-2-chloroaniline (MOCA) (heated at 120° C.). A porous ceramic body was impregnated utilizing the resultant resin mixture in accordance with the method of Example 2 above and the composite material thus formed had chemical, physical and structural characteristics rendering it particularly suitable for the fabrication of prosthetic parts.

In the impregnating method illustrated in Example 2 above, there was described a combination of evacuation of the air from the pores of the ceramic body with the application of positive pressure after introduction of the resin formulation into the vessel 68. It will be apparent that other techniques may be utilized such as the application of atmospheric pressure only or the application of a vacuum only or the application of substantial positive pressure only in order to obtain the deposition of the epoxy resin formulation in the pores for the ceramic body. The technique to be chosen for any particular system will depend upon the viscosity of the impregnating resin solution at the temperature of impregnation, the pot life of the resin solution at the temperature of the impregnation, and the casting time required at the impregnating temperature completely to fill the pores of the ceramic body. The correlation among these variables for a typical epoxy resin system is illustrated graphically in FIG. 14 of the drawings wherein the definite relationship of the viscosity of the epoxy solution to the temperature of the resin solution is plotted along the line 141 wherein it will be seen that the viscosity of the resin solution rapidly decreases with an increase in temperature. However, the pot life of the resin solution such as that in Example 2 above also decreases rapidly with a decrease in temperature as is indicated by the line 142 and, furthermore, the casting time likewise decreases with temperature but at a decreasing rate in the range from about 35° C. to about 59° C. as illustrated by the dashed line 143. When impregnating porous ceramic bodies having the pore size and pore distribution set forth above, it has been found that the maximum workable viscosity of the resin solution is on the order of about 1,500 centipoises, this value being indicated by the horizontal dashed line 144 in FIG. 14. It will be seen therefore that when utilizing the epoxy resin system for which the curves in FIG. 14 were constructed, it is necessary to operate at a temperature above about 35° C. in order to have a sufficiently low viscosity of the resin solution. On the other hand, it is not practicable to operate at a temperature above about 59° C. as indicated by the vertical dashed line 145, since above this temperature the casting time exceeds the pot life of the resin system. A preferred temperature of operation is therefore about 50° C. at which temperature the viscosity of the resin solution is well below 1,500 centipoises and the casting time is appreciably less than the pot life of the resin solution. The controlling parameters for satisfactory impregnation of any porous ceramic body include the viscosity of the resin solution, which is preferably below about 1,500 centipoises as discussed above; the wetting of the ceramic body by the resin solution; the pore size in the ceramic body which in accordance with the present invention is preferably in the range from about 0.5 micron to about 50 microns radius; the size distribution of the pores in ceramic body; and the temperature of the ceramic body at the time of impregnation, a too low temperature prematurely cooling the resin solution to raise the viscosity thereof to an unworkable value before impregnation is complete and a too high temperature causing premature completion of the solidifying reaction of the resin solution whereby to shorten the pot life to a value less than the casting time required to place the resin solution throughout the pores of the ceramic body.

In those cases wherein the size and/or shape of the prosthetic parts indicates that suitable impregnation cannot be obtained because of the parameters set forth above and graphically illustrated in FIG. 14, various changes in the design of the prosthetic part may be made. Referring to FIG. 12 of the drawings, there is shown a hip prosthesis 120 which has had the basic structure thereof modified to facilitate impregnation by a resin solution which is more viscous than that illustrated in Example 2 above. More specifically, the hip prosthesis 120 has had a channel 129 formed interiorly thereof and disposed substantially centrally thereof and extending from the outer surface of the head 121 through the neck 122 and the enlarged portion 126 and substantially to the opposite end of the associated shank 123. The lateral dimension of the channel 129 is greatest at the point thereof where it intersects the surface of the head 121 and gradually decreases in cross section toward the opposite end thereof. Preferably the channel 129 is formed by placing a polyethylene core in the green body prior to the firing thereof and the green body is then fired in a non-oxidizing atmosphere after which it is fired in an oxidizing atmosphere to remove the polyethylene core by burning. After final firing of the hip prosthesis 120, the resin solution is introduced thereinto while the part 120 is at ambient temperature through the channel 129 whereby the resin flows outwardly from the channel 129 toward the outer surface of the hip prosthesis 120 including the surface 124 of the head 121 and the surface 127 of the shaft 123. Since the resin solution is warmer when it is first introduced into the channel 129, the resin quickly flows outwardly throughout the pores to the head 121 completely to fill the passages and pores therein. In the shank 123 on the other hand, the resin will be cooled while moving through the channel 129 and as a consequence the volume 123a along the outer surface of the shank 123 will not be filled with resin but will remain as open pores for accepting the growth of body tissue thereinto for incorporation of the hip prosthesis 120 into the associated femur. The channel 129 will be completely filled by the resin as indicated at 129a and, accordingly, the surface 124 of the head 121 will be smooth with no open pores therein while the shank 123 will have open pores along the surface 127 thereof in the area designated by the numeral 123a in FIG. 12.

Two specific methods of providing pores in the surface of a resin impregnated porous ceramic body have been described heretofore, namely, the leaching of the resin from the surface by means of a suitable solvent such as methylene dichloride when impregnating with an epoxy resin, and the use of a special design of the prosthetic part so that certain portions of the surface thereof are not impregnated as described above with respect to FIG. 12. Yet other methods of providing pores in the surface of the composite material may be utilized such as the oxidation or burning of the resin from the outer surface, the ceramic body being highly resistant to oxidation. Another method of forming pores on the surface of the composite material is to impregnate the area 123a in FIG. 12 with a material, such as a hard wax which is soluble in a liquid petroleum, prior to impregnation with the epoxy resin through the channel 129. Subsequently the epoxy resin will fill all the pores in the hip prosthesis 120 except those designated by the numeral 123a. After the epoxy resin introduced through the channel 129 has been cured, the wax in the area 123a can be dissolved away using the solvent therefor, thereby providing open pores for accepting the growth of body tissue thereinto.

It will be seen that there have been provided improved prosthetic parts and improved materials therefor and methods of making the same which fulfill all of the objects and advantages set forth above. Although certain preferred examples of the invention have been given for purposes of illustration, it will be understood that various changes and modifications can be made therein without departing from the spirit and scope thereof and it is intended to cover in the appended claims all such changes and modifications which fall within the scope of the present invention.

What is claimed is:

1. A prosthetic part for incorporation into the muscular-skeletal system of an animal, said part comprising a body, and structure on said body for attaching said part to the muscular-skeletal system of an associated animal, said body and said attaching structure being formed of a ceramic having a plurality of open cells distributed uniformly therethrough and interconnected to form passages extending from each area therein to other and remote areas therein and to and terminating in pores at the surface thereof, said ceramic being inert to animal fluids and being of a character such that the body tissues of the associated animal will grow thereupon and in contact therewith and into said pores.

2. A prosthetic part for incorporation into the muscular-skeletal system of an animal, said part comprising a body, and structure on said body for attaching said part to the muscular-skeletal system of an associated animal, said body and said attaching structure being formed of a ceramic, at least a portion of the surfaces of said body and said attaching structure having pores therein, said pores having radii in the range from about 0.5 to about 50 microns and constituting from about 6% to about 75% of the surface area of said body and said attaching structure, said ceramic being of a character such that the body tissues of the associated animal will grow thereupon and in contact therewith and into said pores.

3. A prosthetic part for incorporation into the muscular-skeletal system of an animal, said part comprising a body, and structure on said body for attaching said part to the muscular-skeletal system of an associated animal, said body and said attaching structure being formed of a ceramic essentially comprising by weight the equivalent of from about 51% to about 66% aluminum oxide and from about 11% to about 26% silicon oxide and from about 18% to about 28% of oxides of metals selected from the group consisting of alkali metals and alkaline earth metals, said ceramic being inert to attack by animal fluids and being of a character such that the body tissues of the associated animal will grow thereupon and in contact therewith.

4. A prosthetic part for incorporation into the muscular-skeletal system of an animal, said part comprising a body, and structure on said body for attaching said part to the muscular-skeletal system of an associated animal, said body and said attaching structure being formed of a ceramic essentially comprising by weight the equivalent of from about 51% to about 66% aluminum oxide and from about 11% to about 26% silicon oxide and from about 18% to about 28% of the oxide of a metal selected from the group consisting of calcium and magnesium, said ceramic being inert to attack by animal fluids and being of a character such that the body tissues of the associated animal will grow thereupon and in contact therewith.

5. A prosthetic part for incorporation into the muscular-skeletal system of an animal, said part comprising a body, and structure on said body for attaching said part to the muscular-skeletal system of an associated animal, said body and said attaching structure being formed of a ceramic essentially comprising by weight the equivalent of from about 51% to about 66% aluminum oxide and from about 11% to about 26% silica oxide and the remainder of oxides of metals selected from the group consisting of alkali metals and alkaline earth metals, said ceramic being inert to attack by chemical fluids and being of a character such that the body tissues of the associated animal will grow thereupon and in contact therewith.

6. A prosthetic part for incorporation into the muscular-skeletal system of an animal, said part comprising a body, and structure on said body for attaching said part to the muscular-skeletal system of an associated animal, said body and said attaching structure being formed of a porous ceramic impregnated with a synthetic organic plastic resin, said ceramic essentially comprising by weight the equivalent of from about 51% to about 66% aluminum oxida and from about 11% to about 26% silica oxide and the remainder of oxides of metals selected from the group consisting of alkali metals and alkaline earth metals, said porous ceramic having a plurality of open cells distributed therethrough and capillary in size and interconnected to form passages extending from each area in said ceramic to other and remote areas in said ceramic and to and terminating at the surface thereof, said ceramic being inert to attack by animal body fluid and being of a character such that the body tissues of the associated animal will grow thereupon and in contact therewith, said plastic resin being disposed in and substantially completely filling said passages throughout said ceramic, said plastic resin being inert to attack by animal body fluids, said porous ceramic providing first phase in said prosthetic part to contribute rigidly thereto and said plastic resin providing a second phase in said prosthetic part to contribute flexural strength thereto.

7. A prosthetic part for incorporation into the muscular-skeletal system of an animal, said part comprising a body, and structure on said body for attaching said part to the muscular-skeletal system of an associated animal, said body and said attaching structure being formed of a ceramic having a plurality of open cells distributed therethrough and interconnected to form passages extending from each area therein to other and remote areas therein and to and terminating in pores at the surface thereof, said part having a modulus of flexural strength in the range from about 2,500 to about 8,500 pounds per square inch.

8. A prosthetic part for incorporation into the muscular-skeletal system of an animal, said part comprising a body, and structure on said body for attaching said part to the muscular-skeletal system of an associated animal, said body and said attaching structure being formed of a ceramic having a plurality of open cells distributed therethrough and interconnected to form passages extending from each area therein to other and remote areas therein and to and terminating in pores at the surface thereof, said part having a modulus of flexural strength in the range from about 2,500 to about 8,500 pounds per square inch and having a modulus of elasticity in bending in the range from about $0.5 \times 10^6$ to about $2.75 \times 10^6$ pounds per square inch.

9. A prosthetic part for incorporation into the muscular-skeletal system of an animal, said part comprising a body, and structure on said body for attaching said part to the muscular-skeletal system of an associated animal, said body and attaching structure being formed of a porous ceramic impregnated with a synthetic organic plastic resin, said porous ceramic having a plurality of open cells distributed therethrough and capillary in size and interconnected to form passages extending from each area in said ceramic to other and remote areas in said ceramic and to and terminating at the surface thereof, said ceramic being inert to attack by animal body fluids and being of a character such that the body tissues of the associated animal will grow thereupon and in contact therewith, said plastic resin being disposed in and substantially completely filling said passages throughout said ceramic, said plastic resin being inert to attack by animal body fluids, said porous ceramic providing a first phase in said prosthetic part to contribute rigidity thereto and said plastic resin providing a second phase in said prosthetic part to contribute flexural strength thereto, said part having a modulus of flexural strength in the range from about 7,000 to about 12,500 pounds per square inch.

10. A prosthetic part for incorporation into the muscular-skeletal system of an animal, said part comprising a body, and structure on said body for attaching said part to the muscular-skeletal system of an associated animal, said body and attaching structure being formed of a porous ceramic impregnated with a synthetic organic plastic resin, said porous ceramic having a plurality of open cells distributed therethrough and capillary in size and interconnected to form passages extending from each area in said ceramic to other and remote areas in said ceramic and to and terminating at the surface thereof, said ceramic being inert to attack by animal body fluids and being of a character such that the body tissues of the associated animal will grow thereupon and in contact therewith, said plastic resin being disposed in and substantially completely filling said passages throughout said ceramic, said plastic resin being inert to attack by animal body fluids, said porous ceramic providing a first phase in said prosthetic part to contribute rigidity thereto and said plastic resin providing a second phase in said prosthetic part to contribute flexural strength thereto, said part having a modulus of flexural strength in the range of about 7,000 to about 12,500 pounds per square inch and having a modulus of elasticity in bending in the range from about $1 \times 10^6$ to about $5 \times 10^6$ pounds per square inch.

11. A prosthetic part comprising a porous ceramic body having a plurality of open cells distributed uniformly therethrough, said cells being interconnected to form passages extending from each area in said ceramic body to other and remote areas in said ceramic body and to and terminating in pores at the surface of said ceramic body, said ceramic body being inert to attack by animal body fluids, and a filler body disposed in and substantially completely filling said passages throughout said ceramic body, said filler body being inert to attack by animal body fluids, said ceramic body providing a first continuous phase throughout said prosthetic part and said filler body providing a second continuous phase throughout said prosthetic part intimately intertwined and interlocked with said first continuous phase, one of said phases being recessed with respect to the surface of said prosthetic part to provide open pores in said surface adapted to accept the growth of body tissue thereinto for the incorporation of said prosthetic part into the muscular-skeletal system of an associated animal body.

12. A prosthetic part comprising a porous ceramic body having a plurality of open cells distributed uniformly therethrough, said cells being capillary in size and interconnected to form passages extending from each area in said ceramic body to other and remote areas in said ceramic body and to and terminating at the surface of said ceramic body, said ceramic body being inert to attack by animal body fluids, and a filler body disposed in and substantially completely filling said passages throughout said ceramic body, said filler body being formed of a synthetic organic plastic resin inert to attack by animal body fluids, the surface of said resin being recessed with respect to the surface of said ceramic body to provide open pores adapted to accept the growth of body tissue thereinto for the incorporation of said prosthetic part into the muscular-skeletal system of an associated animal body, said ceramic body providing a first continuous phase throughout said prosthetic part to contribute rigidity thereto and said filler body providing a second continuous phase throughout said prosthetic part intimately intertwined and inerlocked with said first continuous phase to contribute flexural strength thereto.

13. A prosthetic part for incorporation into the muscular-skeletal system of an animal, said part comprising a body, and structure on said body for attaching said part to the muscular-skeletal system of an associated animal, said body and said attaching structure being formed of a porous ceramic impregnated with a synthetic organic plastic resin, said porous ceramic having a plurality of open cells distributed therethrough and capillary in size and interconnected to form passages extending from each area in said ceramic to other and remote areas in said ceramic and to and terminating at the surface thereof, said ceramic being inert to attack by animal body fluids and being of a character such that the body tissues of the associated animal will grow thereupon and in contact therewith, said plastic resin being disposed in and substantially completely filling said passages throughout said ceramic, said plastic resin being inert to attack by animal body fluids, said porous ceramic providing a first phase in said prosthetic part to contribute rigidity thereto and said plastic resin providing a second phase in said prosthetic part to contribute flexural strength thereto.

14. A prosthetic part for incorporation into the muscular-skeletal system of an animal, said part comprising a body, and structure on said body for attaching said part to the muscular-skeletal system of an associated animal, said body and said attaching structure being formed of a porous ceramic impregnated with a synthetic organic plastic resin selected from the group consisting of epoxy resins and polyurethane resins, said porous ceramic having a plurality of open cells distributed therethrough and capillary in size and interconnected to form passages extending from each area in said ceramic to other and remote areas in said ceramic and to and terminating at the surface thereof, said ceramic being inert to attack by animal body fluids and being of a character such that the body tissues of the associated animal body will grow thereupon and in contact therewith, said plastic resin being disposed in and substantially completely filling said passages throughout said ceramic, said plastic resin being inert to attack by animal body fluids and being tightly adherent to the walls of said passages throughout the contacting surfaces thereof, said porous ceramic providing a first phase throughout said prosthetic part to contribute rigidity thereto and said plastic resin providing a second phase throughout said prosthetic part to contribute flexural strength thereto.

15. A prosthetic part for incorporation into the muscular-skeletal system of an animal, said part comprising a body, and structure on said body for attaching said part to the muscular-skeletal system of an associated animal, said body and said attaching structure being formed of a porous ceramic impregnated with a synthetic organic plastic resin, said ceramic essentially comprising by weight the equivalent of from about 51% to about 66% aluminum oxide and from about 11% to about 26% silicon oxide and from about 18% to about 28% of oxides of metals selected from the group consisting of alkali metals and alkaline earth metals, said porous ceramic having a plurality of open cells distributed therethrough and capillary in size and interconnected to form passages extending from each area in said ceramic to other and remote areas in said ceramic and to and terminating at the surface thereof, said ceramic being inert to attack by animal body fluids and being of a character such that the body tissues of the associated animal will grow thereupon and in contact therewith, said plastic resin being disposed in and substantially completely filling said passages throughout said ceramic, said plastic resin being inert to attack by animal body fluids, said porous ceramic providing a first phase in said prosthetic part to contribute rigidity thereto and said plastic resin providing a second phase in said prosthetic part to contribute flexural strength thereto.

16. A prosthetic part for incorporation into the muscular-skeletal system of an animal, said part comprising a body, and structure on said body for attaching said part to the muscular-skeletal system of an associated animal, said body and said attaching structure being formed of a porous ceramic impregnated with a synthetic organic plastic resin selected from the group consisting of epoxy resins and polyurethane resins, said ceramic essentially comprising by weight the equivalent of from about 51% to about 66% aluminum oxide and from about 11% to about 26% silicon oxide and from about 18% to about 28% of oxides of metals selected from the group consisting of alkali metals and alkaline earth metals, said porous ceramic having a plurality of open cells distributed therethrough and capillary in size and interconnected to form passages extending from each area in said ceramic to other and remote areas in said ceramic and to and terminating at the surface thereof, said ceramic being inert to attack by animal body fluids and being of a character such that the body tissues of the associated animal will grow thereupon and in contact therewith, said plastic resin being disposed in and substantially completely filling said passages throughout said ceramic and being tightly adherent to the walls of said passages throughout the contacting surfaces thereof, said plastic resin being inert to attack by animal body fluids, said porous ceramic providing a first phase in said prosthetic part to contribute rigidity thereto and said plastic resin providing a second phase in said prosthetic part to contribute flexural strength thereto.

17. A prosthetic part for incorporation into the muscular-skeletal system of an animal, said part comprising a body, and structure on said body for attaching said part to the muscular-skeletal system of an associated animal, said body and said attaching structure being formed of a porous ceramic impregnated with a synthetic organic plastic resin selected from the group consisting of epoxy resins and polyurethane resins, said ceramic essentially comprising by weight the equivalent of from about 51% to about 66% aluminum oxide and from about 11% to about 26% silicon oxide and from about 18% to about 28% of oxides of metals selected from the group consisting of alkali metals and alkaline earth metals, said porous ceramic having a plurality of open cells distributed therethrough and capillary in size and interconnected to form passages extending from each area in said ceramic to other and remote areas in said ceramic and to and terminating at the surface thereof, said passages having radii in the range from about 0.5 to about 50 microns and constituting from about 6% to about 75% of the volume of said porous ceramic, said ceramic being inert to attack by animal body fluids and being of a character such that the body tissues of the associated animal will grow thereupon and in contact therewith, said plastic resin being disposed in and substantially completely filling said passages throughout said ceramic and being tightly adherent to the walls of said passages throughout the contacting surfaces thereof, said plastic resin being inert to attack by animal body fluids, said porous ceramic providing a first phase throughout said prosthetic part to contribute rigidity thereto and said plastic resin providing a second phase throughout said prosthetic part to contribute flexural strength thereto.

18. An internal hip prosthesis comprising a porous ceramic body shaped to provide a head having a part-spherical bearing surface adapted to be received in an associated cavity and a shank integral with said head and extending outwardly therefrom and adapted to be disposed in an associated femur, said ceramic body having a plurality of interconnected passages therein distributed uniformly therethrough and extending from each area in said ceramic body to other and remote areas in said ceramic body and to and terminating at pores in the surface of said ceramic body, said ceramic body being inert to attack by animal fluids, and a filler body of synthetic organic plastic resin disposed in and substantially completely filling said passages throughout said ceramic body, said resin being inert to attack by animal body fluids and being tightly adherent to the walls of said passages throughout the contacting surfaces thereof, said ceramic body providing a first continuous phase through said hip prosthesis to contribute rigidity thereto and said filler body providing a second continuous phase throughout said hip prosthesis intimately intertwined and interlocked with said first continuous phase to contribute flexural strength thereto.

19. An internal hip prosthesis comprising a porous ceramic body shaped to provide a head having a part-spherical bearing surface adapted to be received in an associated cavity and a shank integral with said head and extending outwardly therefrom and adapted to be disposed in an associated femur, said ceramic body having a plurality of interconnected passages therein distributed uniformly therethrough and extending from each area in said ceramic body to other and remote areas in said ceramic body to other and remote areas in said ceramic body and to and terminating at pores in the surface of said ceramic body, said ceramic body being inert to attack by animal fluids, and a filler body of synthetic organic plastic resin disposed in and substantially completely filling said passages throughout said ceramic body, said resin being inert to attack by animal body fluids and being tightly adherent to the walls of said passages throughout the contacting surfaces thereof, the outer surface of said ceramic body and the outer surface of said resin lying on the surface of a sphere in the area of said head to provide said part-spherical bearing surface thereon, the surface of said resin along said shank being recessed with respect to the adjacent surface of said ceramic body to provide open pores adapted to accept the growth of body tissue thereinto for the incorporation of said hip prosthesis into the muscular-skeletal system of an associated animal body.

20. An internal hip prosthesis comprising a porous ceramic body shaped to provide a head having a part-spherical bearing surface adapted to be received in an associated cavity and a shank integral with said head and extending outwardly therefrom and adapted to be disposed in an associated femur, said ceramic body having a plurality of interconnected passages therein distributed uniformly therethrough and extending from each area in said ceramic body to other and remote areas in said ceramic body and to and terminating at pores in the surface of said ceramic body, said passages and said pores having radii in the range from about 0.5 to about 50 microns and constituting respectively from about 6% to about 75% of the volume of said ceramic body and of the area of said porous surface, said ceramic body being inert to attack by animal fluids, and a filler body of synthetic organic plastic resin disposed in and substantially completely filling said passages throughout said ceramic body, said resin being inert to attack by animal body fluids and being tightly adherent to the walls of said passages throughout the contacting surfaces thereof, said ceramic body providing a first continuous phase through said hip prosthesis to contribute rigidity thereto and said filler body providing a second continuous phase throughout said hip prosthesis intimately intertwined and interlocked with said first continuous phase to contribute flexural strength thereto.

21. The method of making a prosthetic part comprising providing a porous ceramic body having a plurality of interconnected capillary passages therein extending from each area in said ceramic body to other and remote areas in said ceramic body and to and terminating in pores at the surface thereof; providing a liquid filler material having a low viscosity and including a synthetic organic plastic resin; placing said liquid filler material through said pores into said passages throughout said ceramic body; and treating said filler material in said passages to form a solid filler body disposed in and substantially filling said passages to provide a prosthetic part in which said ceramic body comprises a first continuous phase therethrough and said filler body comprises a second continuous phase therethrough and intimately intertwined and interlocked with said first continuous phase.

22. The method of making a prosthetic part comprising providing a porous ceramic body having a plurality of interconnected capillary passages therein extending from each area in said ceramic body to other and remote areas in said ceramic body and to and terminating in pores at the surface thereof; providing a liquid filler material having a low viscosity and including a synthetic organic plastic resin; placing said liquid filler material through said pores into said passages throughout said ceramic body; removing said filler material from the outer portion of said passages to provide open pores at and near the surface of said ceramic body; and curing said filler material at an elevated temperature in said passages to form a solid filler body disposed in and substantially filling said passages exclusive of said open pores to provide a prosthetic part in which said ceramic body comprises a first continuous phase therethrough and said filler body comprises a second continuous phase therethrough and intimately intertwined and interlocked with said first continuous phase.

23. The method of making a prosthetic part comprising providing a porous ceramic body having a plurality of interconnected capillary passages therein extending from each area in said ceramic body to other and remote areas in said ceramic body and to and terminating in pores at the surface thereof; providing a liquid filler material having a low viscosity and including an epoxy resin and a hardener therefor; placing said liquid filler material through said pores into said passages throughout said ceramic body; leaching said filler material from the outer portion of said passages with methylene dichloride to provide open pores at and near the surface of said ceramic body; and curing said filler material at an elevated temperature in said passages to form a solid filler body disposed in and substantially filling said passages exclusive of said open pores to provide a prosthetic part in which said ceramic body comprises a first continuous phase therethrough and said filler body comprises a second continuous phase therethrough and intimately intertwined and interlocked with said first continuous phase.

24. The method of making a prosthetic part comprising providing a porous ceramic body having a plurality of interconnected capillary passages therein extending from each area in said ceramic body to other and remote areas in said ceramic body and to and terminating in pores at the surface thereof, said passages and said pores having radii in the range from about 0.5 to about 50 microns and constituting respectively from about 6% to about 75% of the volume of said ceramic body and of the area of said porous surface; providing a liquid filler material having a viscosity of less than about 1500 centipoises and including a synthetic organic plastic resin; placing said liquid filler material through said pores into said passages throughout said ceramic body; and treating said filler material in said passages to form a solid filler body disposed in and substantially filling said passages to provide a prosthetic part in which said ceramic body comprises a first continuous phase therethrough and said filler body comprises a second continuous phase therethrough and intimately intertwined and interlocked with said first continuous phase.

25. The method of making a prosthetic part comprising providing a porous ceramic body having a plurality of interconnecting capillary passages therein extending from each area in said ceramic body to other and remote areas in said ceramic body and to and terminating in pores at the surface thereof; filling a portion of the pores with a blocking material; providing a liquid filler material having a low viscosity and including a synthetic organic plastic resin; placing said liquid filler material through said pores and into said passages not filled with said blocking material and throughout said ceramic body; treating said filler material in said passages to form a solid filler body disposed in and substantially filling said passages exclusive of said passages and said pores having said blocking material therein to provide a prosthetic part in which said ceramic body comprises a first continuous phase therethrough and said filler body comprises a second continuous phase therethrough and intimately intertwined and interlocked with said first continuous phase; and removing said blocking material from the associated passages and pores to provide open pores at and near the adjacent surface of said ceramic body.

26. The method of making a prosthetic part comprising providing a porous ceramic body having a channel therein substantially centrally thereof and communicating with one surface thereof, said ceramic body having a plurality of interconnected capillary passages therein extending from each area in said ceramic body to other and remote areas in said ceramic body and to and terminating in pores at the surface thereof and in said channel; filling a portion of the pores and the communicating passages disposed away from said channel with a blocking material; providing a liquid filler material having a low viscosity and including a synthetic organic plastic resin; placing said liquid filler material through said channel and associated pores into the remaining passages throughout said ceramic body; removing said blocking material from the associated passages and pores to provide open pores at and near the adjacent surface of said ceramic body; and treating said filler material in said passages to form a solid filler body disposed in and substantially filling said passages exclusive of said open pores to provide a prosthetic part in which said ceramic body comprises a first continuous phase therethrough and said filler body comprises a second continuous phase therethrough and intimately intertwined and interlocked with said first continuous phase.

References Cited by the Examiner

UNITED STATES PATENTS

| | | | |
|---|---|---|---|
| 2,463,551 | 3/1949 | Meyerson et al. | 117—61 |
| 2,688,139 | 9/1954 | Jardon | 3—13 |

FOREIGN PATENTS 923,383    2/1955    Germany.

OTHER REFERENCES

Scientific Glass Apparatus Company, Incorporated, catalogue, copyright 1959, Bloomfield, N.J., 1558 pages, only pp. 448, 449 relied upon.

RICHARD A. GAUDET, *Primary Examiner.*

JORDAN FRANKLIN, *Examiner.*

H. R. GOLDBERG, J. W. HINEY, *Assistant Examiners.*